(12) United States Patent
Yamaguchi

(10) Patent No.: US 8,049,945 B2
(45) Date of Patent: Nov. 1, 2011

(54) OPTICAL BEAM SCANNING DEVICE AND IMAGE FORMING APPARATUS PROVIDED WITH THE SAME

(75) Inventor: Masao Yamaguchi, Tokyo (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/974,227

(22) Filed: Dec. 21, 2010

(65) Prior Publication Data
US 2011/0090550 A1    Apr. 21, 2011

Related U.S. Application Data

(63) Continuation of application No. 11/421,462, filed on May 31, 2006, now Pat. No. 7,876,487.

(51) Int. Cl.
*G02B 26/06* (2006.01)
(52) U.S. Cl. .................................................. 359/216.1
(58) Field of Classification Search ..... 359/216.1–218.1
See application file for complete search history.

(56) References Cited

U.S. PATENT DOCUMENTS

| | | | |
|---|---|---|---|
| 6,839,076 B2 | 1/2005 | Yamaguchi | |
| 6,888,655 B2 | 5/2005 | Yamaguchi | |
| 6,980,342 B1 | 12/2005 | Yamaguchi | |
| 6,995,888 B1 * | 2/2006 | Kaneko et al. | 359/216.1 |
| 2003/0020801 A1 | 1/2003 | Yamaguchi et al. | |
| 2004/0190099 A1 | 9/2004 | Yamaguchi | |
| 2005/0002076 A1 | 1/2005 | Yamaguchi | |
| 2005/0110862 A1 | 5/2005 | Yamaguchi | |

FOREIGN PATENT DOCUMENTS

| | | |
|---|---|---|
| JP | 2002-328323 | 11/2002 |
| JP | 2005-024958 | 1/2005 |
| JP | 2005-049506 | 2/2005 |
| JP | 2005-049509 | 2/2005 |
| JP | 2005-062399 | 3/2005 |

OTHER PUBLICATIONS

Beiser, Laser Scanning Notebook, LSN-8-11/91, The Polygon Scanner, 1992.
U.S. Office Action for U.S. Appl. No. 11/421,462 mailed on Jun. 1, 2010.

* cited by examiner

*Primary Examiner* — Euncha Cherry
(74) *Attorney, Agent, or Firm* — Turocy & Watson, LLP

(57) ABSTRACT

A technique is provided which can improve optical characteristics by suppressing the occurrence of an error in attachment of a rotary deflector that deflects a light flux from a light source and scans it in a main scanning direction. There are provided a rotary deflector that deflects the light flux from the light source and scans it in the main scanning direction, an imaging optical system that images the light flux scanned by the rotary deflector onto a specified scanning object, a support part that supports the rotary deflector rotatably, and a positioning part that comes in contact with the support part at plural contact positions and positions the support part, in which a shortest distance between the plural contact positions in an optical axis direction of the imaging optical system is longer than a shortest distance between the plural contact positions in the main scanning direction.

19 Claims, 21 Drawing Sheets

FIG. 5

INCIDENT SURFACE

| CUY | CYZ | AY | AZ |
|---|---|---|---|
| -6.19E-03 | -7.12E-03 | 1 | 1 |

| n \ m | 0 | 1 | 2 | 3 | 4 | 5 | 6 | 7 | 8 | 9 | 10 |
|---|---|---|---|---|---|---|---|---|---|---|---|
| 0 | 0.00E+00 | -1.54E-03 | 1.84E-03 | -2.07E-07 | 1.18E-07 | 5.92E-12 | -5.89E-12 | -2.33E-15 | 3.31E-16 | -1.28E-19 | -1.93E-20 |
| 1 | 1.34E-02 | -1.25E-06 | -2.09E-07 | -1.37E-10 | 1.11E-10 | -5.79E-14 | -8.30E-15 | -1.04E-17 | 4.72E-19 | 1.31E-21 | 2.24E-23 |
| 2 | 2.26E-05 | -1.73E-09 | 4.67E-11 | 3.62E-12 | -1.18E-13 | -1.23E-15 | 2.14E-17 | -3.94E-21 | 8.65E-21 | 1.92E-23 | -1.93E-25 |

OUTGOING SURFACE

| CUY | CYZ | AY | AZ |
|---|---|---|---|
| 3.26E-03 | 2.76E-02 | 1 | 1 |

| n \ m | 0 | 1 | 2 | 3 | 4 | 5 | 6 | 7 | 8 | 9 | 10 |
|---|---|---|---|---|---|---|---|---|---|---|---|
| 0 | 0.00E+00 | -1.69E-03 | -9.88E-04 | -1.85E-07 | 6.45E-08 | -6.44E-12 | -3.12E-12 | 3.44E-16 | 1.40E-16 | -3.37E-19 | -1.74E-20 |
| 1 | 3.37E-03 | -7.72E-07 | -4.14E-07 | -2.46E-10 | 6.75E-11 | 2.42E-14 | -1.50E-15 | -1.30E-17 | -1.04E-19 | 3.36E-22 | 4.27E-23 |
| 2 | 5.30E-06 | 7.69E-10 | 4.85E-10 | 2.42E-13 | 1.44E-13 | 1.32E-16 | -2.28E-17 | -1.32E-19 | 3.18E-21 | 1.54E-23 | 3.40E-25 |

FIG. 11

ROTATION AROUND MAIN SCANNING AXIS

| DISTANCE BETWEEN CONTACT POSITIONS IN OPTICAL AXIS DIRECTION (mm) | 100 | 80 | 60 | 40 | 20 |
|---|---|---|---|---|---|
| ANGLE (°) | 0.028648 | 0.03581 | 0.047746 | 0.07162 | 0.143239 |
| BEAM DIAMETER (μm) | 50 | 50 | 52 | 53 | 98 |

FIG. 12

ROTATION AROUND OPTICAL AXIS

| DISTANCE BETWEEN CONTACT POSITIONS IN MAIN SCANNING DIRECTION (mm) | 100 | 80 | 60 | 40 | 20 |
|---|---|---|---|---|---|
| ANGLE (°) | 0.028648 | 0.03581 | 0.047746 | 0.07162 | 0.143239 |
| BEAM DIAMETER (μm) | 50 | 50 | 50 | 50 | 50 |

OPTICAL BEAM SCANNING DEVICE AND IMAGE FORMING APPARATUS PROVIDED WITH THE SAME

CROSS-REFERENCE TO RELATED APPLICATIONS

This application is a Continuation of application Ser. No. 11/421,462 filed on May 31, 2006, the entire contents of which are incorporated herein by reference.

BACKGROUND OF THE INVENTION

1. Field of the Invention

The present invention relates to an optical beam scanning device used for a laser printer, a digital copying machine or the like, and relates to an attachment mechanism of a rotary deflector that deflects a light flux from a light source and scans it in a main scanning direction.

2. Description of the Related Art

Hitherto, there is known an optical beam scanning device using a rotary deflector, such as a polygon mirror, that deflects a light flux from a light flux and scans it in a main scanning direction (JP-A-2002-328323, U.S. Pat. No. 6,888,655, JP-A-2005-24958, JP-A-2005-49506, JP-A-2005-49509, JP-A-2005-62399).

In such an optical beam scanning device, an error in attachment of the rotary deflector to the device has a large influent on the optical characteristics of the optical beam scanning device. Particularly, as compared with an attachment error to cause the rotation of a post-deflection optical system around an optical axis, an attachment error to cause the rotation around an axis parallel to the main scanning direction has a large influence on a wave aberration, and causes an increase in beam diameter and a degradation in beam profile.

SUMMARY OF THE INVENTION

An embodiment of the invention has an object to provide a technique which can improve optical characteristics by suppressing the influence of an error in attachment of a rotary deflector that deflects a light flux from a light source and scans it in a main scanning direction.

In order to solve the foregoing problem, an optical beam scanning device of the invention has a structure characterized by comprising a rotary deflector that deflects a light flux from a light source and scans it in a main scanning direction, an imaging optical system that images the light flux scanned by the rotary deflector onto a scanning object, a support part that supports the rotary deflector rotatably, and a positioning part that comes in contact with the support part at plural contact positions and positions the support part, in which a shortest distance between the plural contact positions in an optical axis direction of the imaging optical system is longer than a shortest distance between the plural contact positions in the main scanning direction.

Besides, an image forming apparatus of the invention has a structure characterized by comprising an optical beam scanning device having a structure as stated above, a photosensitive body on which an electrostatic latent image is formed by a light flux scanned by the optical beam scanning device, and a developing part that reveals the electrostatic latent image formed on the photosensitive body.

Besides, an optical beam scanning device of the invention has a structure characterized by comprising optical beam scanning means for scanning a light flux from a light source in a main scanning direction by rotating while deflecting it, imaging means for imaging the light flux scanned by the optical beam scanning means onto a scanning object, support means for supporting the optical scanning means rotatably, and positioning means for positioning the support means by coming in contact with the support means at plural contact positions, in which a shortest distance between the plural contact positions in an optical axis direction of the imaging means is longer than a shortest distance between the plural contact positions in the main scanning direction.

Besides, an image forming apparatus of the invention has a structure characterized by comprising an optical beam scanning device having a structure as stated above, image bearing means on which an electrostatic latent image is formed by a light flux scanned by the optical beam scanning device, and developing means for revealing the electrostatic latent image formed on the photosensitive body.

DESCRIPTION OF THE DRAWINGS

FIG. 5 shows coordinate data indicating a shape of a lens surface of an imaging lens (fθ lens) 61.

FIG. 11 is a table showing a simulation result concerning a relation among a distance between contact positions, an inclined angle of a polygon mirror and a beam diameter of a scanning light beam.

FIG. 12 is a table showing a simulation result concerning a relation among a distance between contact positions, an inclined angle of a polygon mirror and a beam diameter of a scanning light beam.

DESCRIPTION OF THE EMBODIMENTS

Hereinafter, embodiments of the invention will be described with reference to the drawings.

Figure 1:
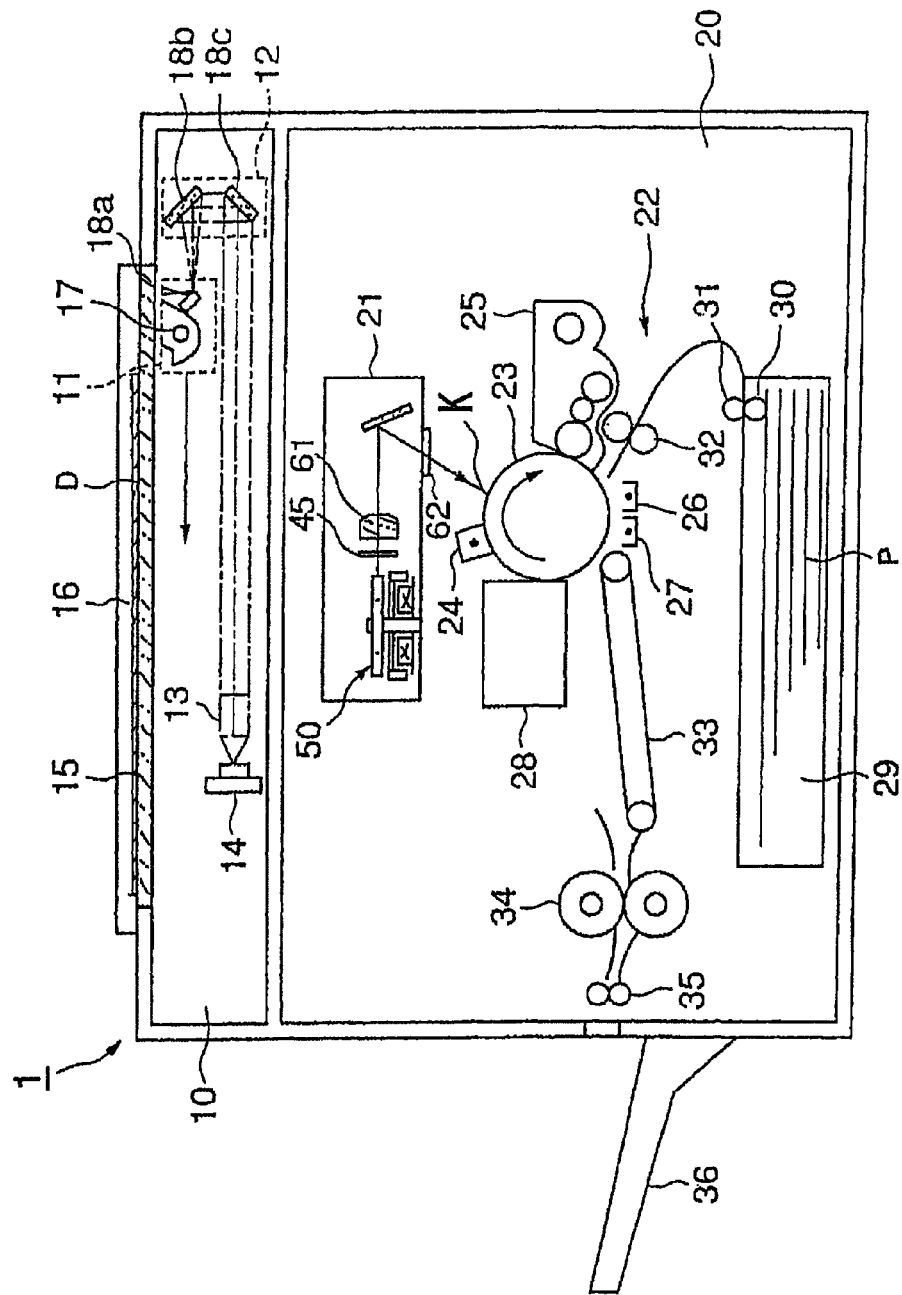
FIG. 1 is a view showing a digital copying machine as an image forming apparatus provided with an optical beam scanning device of an embodiment of the invention.

FIG. 1 is a view showing a digital copying machine (for example, Multi Function Peripheral (MFP), etc.) as an image forming apparatus provided with an optical beam scanning device of an embodiment of the invention.

As shown in FIG. 1, a digital copying apparatus 1 includes, for example, a scanner part 10 as image reading means and a printer part 20 as image forming means.

The scanner part 10 includes a first carriage 11 formed movably in a direction of an arrow, a second carriage 12 driven and moved by the first carriage 11, an optical lens 13 to give a specified imaging characteristic to a light beam from the second carriage 12, a photoelectric conversion element 14 that photoelectrically converts the light beam to which the specified imaging characteristic has been given by the optical lens 13 and outputs an electric signal, a document table 15 to hold a document D, a document fixing cover 16 to press the document D to the document table 15, and the like.

The first carriage 11 includes a light source 17 to illuminate the document D, and a mirror 18a to reflect a reflected light beam, which has been reflected from the document D illuminated by a light beam emitted by the light source 17, to the second carriage 12.

The second carriage 12 includes a mirror 18b to bend the light beam transmitted from the mirror 18a of the first carriage 11 by 90°, and a mirror 18c to further bend the light beam, which has been bent by the mirror 18b, by 90°.

The document D placed on the document table 15 is illuminated by the light source 17, and reflects the reflected light beam in which the variations of light and shade corresponding to the presence/absence of an image are distributed. The reflected light beam of the document D, as image information of the document D, is incident on the optical lens 13 through the mirrors 18a, 18b and 18c.

The reflected light beam guided to the optical lens 13 from the document D is condensed by the optical lens 13 onto the light receiving surface of the photoelectric conversion element (CCD sensor) 14.

When the start of image formation is instructed from a not-shown operation panel or an external device, the first carriage 11 and the second carriage 12 are once moved by driving of a not-shown carriage driving motor to a home position determined so that they have a specified positional relation relative to the document table 15, and then are moved at a specified speed along the document table 15, so that the image information of the document D, that is, the image light beam reflected from the document D is cut out to have a specified width in a direction in which the mirror 18a is extended, that is, in a main scanning direction and is reflected toward the mirror 18b, and is successively taken out in units of the width cut out by the mirror 18a and in a direction perpendicular to the direction in which the mirror 18a is extended, that is, in a sub-scanning direction, and all image information of the document D is guided to the CCD sensor 14. Incidentally, an electric signal outputted from the CCD sensor 14 is an analog signal, and is converted into a digital signal by a not-shown A/D converter, and is temporarily stored as an image signal into a not-shown image memory.

In the manner as stated above, the image of the document D placed on the document table 15 is converted into, for example, an 8-bit digital image signal indicating the density of the image by a not-shown image processing part for each line along a first direction in which the mirror 18a is extended.

The printer part 20 includes an optical beam scanning device 21 as an exposure device described in a later section, and an electrophotographic image forming part 22 capable of forming an image on a recording sheet P as a medium on which an image is to be formed.

The image forming part 22 includes a drum-shaped photosensitive body (hereinafter referred to as a photoconductive drum) 23 that is rotated by an after-mentioned main motor so that its outer peripheral surface moves at a specified speed, and is irradiated (scanned) with a laser beam L from the optical beam scanning device 21 so that an electrostatic latent image corresponding to image data, that is, an image of the document D is formed, a charging device 24 to give a surface potential with a specified polarity to the surface of the photoconductive drum (image bearing means) 23, a developing device (developing part, developing means) 25 to selectively supply a toner as a visualizing agent to the electrostatic latent image formed on the photoconductive drum 23 by the optical beam scanning device and performs development (revealing an image), a transfer device 26 that gives a specified electric field to the toner image formed on the outer periphery of the photoconductive drum 23 by the developing device 25 and transfers it onto the recording sheet P, a separating device 27 that releases the recording sheet P on which the toner image has been transferred by the transfer device and the toner between the recording sheet P and the photoconductive drum 23 from electrostatic attachment and separates them (from the photoconductive drum 23), a cleaning device 28 that removes the transfer residual toner remaining on the outer peripheral surface of the photoconductive drum 23 and returns the potential distribution of the photoconductive drum 23 to the state before the surface potential is supplied by the charging device 24, and the like. Incidentally, the charging device 24, the developing device 25, the transfer device 26, the separating device 27 and the cleaning device 28 are sequentially arranged along the arrow direction in which the photoconductive drum 23 is rotated. Besides, the laser beam L from the optical beam scanning device is irradiated to a specified position K on the photoconductive drum 23 between the charging device 24 and the developing device 25.

The image signal read from the document D by the scanner part 10 is converted into a printing signal in a not-shown image processing part by a processing such as, for example, a contour correction or a gradation processing for halftone display, and is further converted into a laser modulating signal to change the light intensity of the laser beam emitted from an after-described semiconductor laser element of the optical beam scanning device 21 into one of the intensity at which the electrostatic latent image can be recorded on the outer periphery of the photoconductive drum 23 to which the specified surface potential has been given by the charging device 24 and the intensity at which the latent image is not recorded.

Each of semiconductor laser elements of the optical beam scanning device 21 described below is intensity-modulated in accordance with the foregoing laser modulating signal, and emits a light beam so that the electrostatic latent image is recorded at a specified position of the photoconductive drum 23 correspondingly to the specified image data. The light beam from the semiconductor laser element is deflected in a first direction as the same direction as a reading line of the scanner part 10 by a polygon mirror (rotary deflector) as after-described optical beam scanning means in the optical beam scanning device 21, and is irradiated to the specified position K on the outer periphery of the photoconductive drum 23.

The photoconductive drum 23 is rotated in the arrow direction at a specified speed, so that, similarly to the movement of the first carriage 11 and the second carriage 12 of the scanner part 10 along the document table 7, the laser beam from the semiconductor laser element (light source) sequentially deflected by the polygon mirror is exposed onto the outer periphery of the photoconductive drum 23 at specified intervals for each line.

In the manner as stated above, the electrostatic latent image corresponding to the image signal is formed on the outer periphery of the photoconductive drum 23.

The electrostatic latent image formed on the outer periphery of the photoconductive drum 23 is developed with the toner from the developing device 25, is transported to a position opposite to the transfer device 26 by the rotation of the photoconductive drum 23, and is transferred onto the recording sheet P, which is taken out from a sheet cassette 29 by a paper feed roller 30 and a separation roller 31 and is supplied while the timing is adjusted by an aligning roller 32, by the electric field from the transfer device 26.

The recording sheet P on which the toner image has been transferred, together with the toner, is separated by the separating device 27, and is guided to a fixing device 34 by a transport device 33.

The toner (toner image) is fixed by the heat and pressure from the fixing device 34 onto the recording sheet P guided to the fixing device 34, and then the sheet is discharged to a tray 36 by a paper discharge roller 35.

On the other hand, the photoconductive drum 23 after the toner image (toner) has been transferred on the recording sheet P by the transfer device 26 is made to face the cleaning device 28 as a result of the subsequent rotation, and the transfer remaining toner (residual toner) remaining on the outer periphery is removed, and further, the photoconductive drum 23 return to a state (initial state) before the surface potential is supplied the charging device 24, and next image formation becomes possible.

The above process is repeated, so that a continuous image forming operation becomes possible.

As stated above, with respect to the document D set on the document table 15, the image information is read by the scanner part 10, and the read image information is converted into the toner image by the printer part 20 and is outputted to the recording sheet P, so that copying is performed.

Incidentally, although the description of the image forming apparatus has been made while the digital copying machine is used as an example, for example, a printer apparatus in which an image reading part does not exist may be used.

Figure 2:
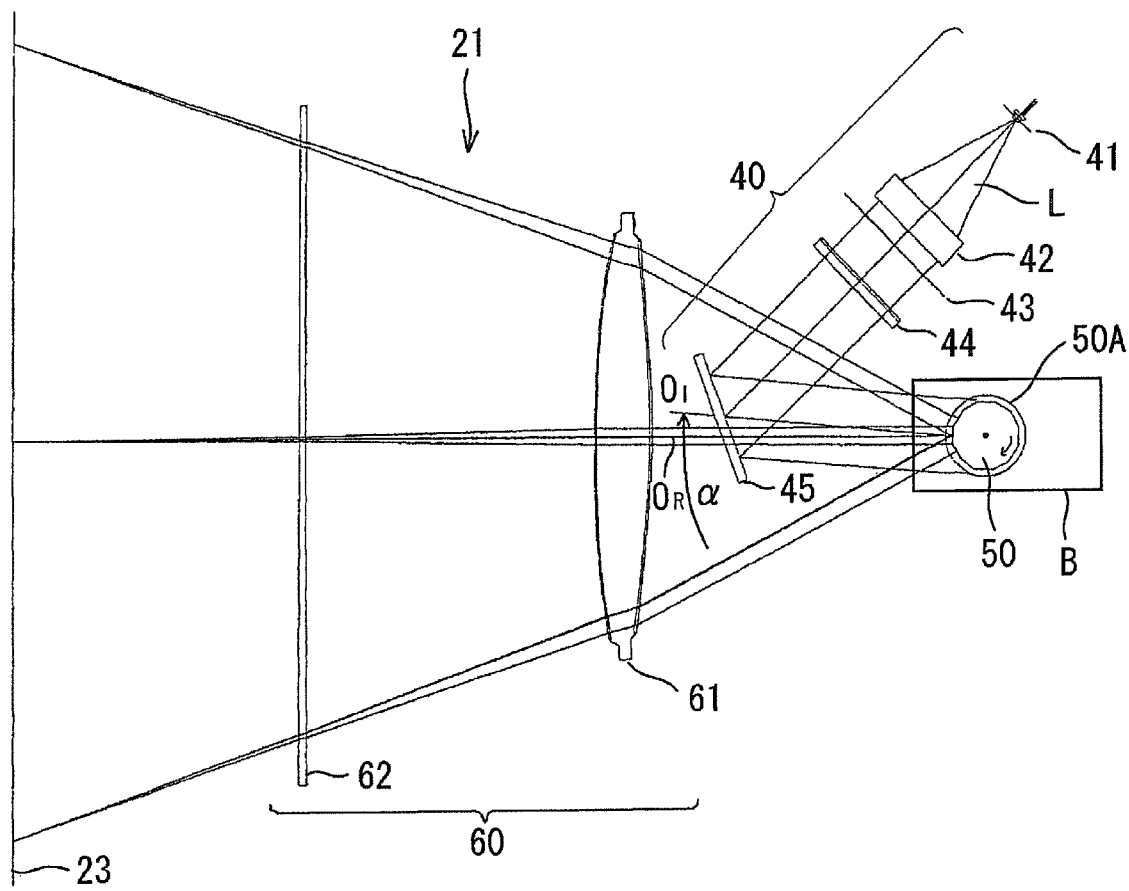
FIG. 2 is a schematic view for explaining the structure of the optical beam scanning device shown in FIG. 1.
Figure 3:
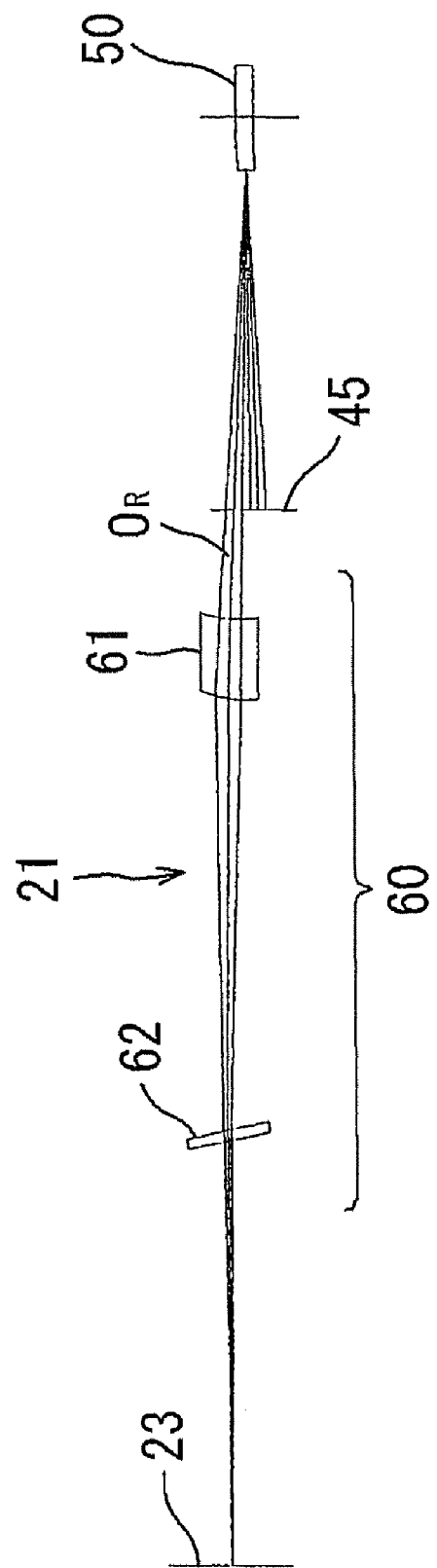
FIG. 3 is a schematic view for explaining the structure of the optical beam scanning device shown in FIG. 1.

FIG. 2 and FIG. 3 are schematic views for explaining the structure of the optical beam scanning device shown in FIG. 1. Incidentally, FIG. 2 is a schematic plan view in which optical elements arranged between the semiconductor laser element (light source) included in the optical beam scanning device and the photoconductive drum (scanning object) are seen from a direction perpendicular to the main scanning direction (first direction) as the direction parallel to the specified scanning direction in which the light beam directed to the photoconductive drum from the polygon mirror is scanned by the polygon mirror and the turnover by the mirror is expanded and explained, and FIG. 3 is a schematic sectional view showing a state in which the sub-scanning direction (second direction) perpendicular to the direction shown in FIG. 2, that is, the main scanning direction is on a plane. Incidentally, here, a direction perpendicular to an optical axis of an optical system and a rotation axis direction of the polygon mirror is the main scanning direction, and the rotation axis direction of the polygon mirror is the sub-scanning direction.

As shown in FIG. 2 and FIG. 3, the optical beam scanning device 21 includes a pre-deflection optical system 40 which includes a semiconductor laser element (light source) 41 to emit the laser beam (light beam) L of, for example, 658 nm, a collimate lens 42 to convert the cross-sectional beam shape of the laser beam L emitted from the semiconductor laser element 41 into a converging light beam, a parallel light beam or a divergent light beam, an aperture 43 to limit the light amount (light flux width) of the laser beam L having passed through the collimate lens 42 to a specified magnitude, a cylindrical lens 44 in which a positive power is given only in the sub-scanning direction in order to shape the cross-sectional shape of the laser beam L the light amount of which has been limited by the aperture 43 into a specified cross-sectional beam shape, and a mirror 45 to bend the laser beam L from the semiconductor laser element 41, the cross-sectional shape of which has been shaped into the specified cross-sectional beam shape by the finite focal lens or collimate lens 42, the aperture 43 and the cylindrical lens 44, to a specified direction, and the like.

In the direction in which the laser beam L to which the specified cross-sectional beam shape has been given by the pre-deflection optical system 40 travels, the polygon mirror 50 is provided which is formed integrally with a polygon motor 50A rotating at a specified speed and scans the laser beam L, the cross-sectional beam shape of which has been shaped into the specified shape by the cylindrical lens 44, to the photoconductive drum (surface to be scanned) 23 positioned at a later stage.

Between the polygon mirror 50 and the photoconductive drum 23, an imaging optical system (imaging means) 60 is provided which images the laser beam L, which has been continuously reflected by each reflecting surface of the polygon mirror 50, substantially linearly along the axial direction of the photoconductive drum 23.

The imaging optical system 60 includes an imaging lens (normally called an fθ lens) 61 that irradiates the laser beam L, which is continuously reflected by the respective reflecting surfaces of the polygon mirror 50, from one end to the other end of the photoconductive drum 23 in the longitudinal (axial line) direction at the exposure position K shown in FIG. 1 while the position on the photoconductive drum 23 at the time of irradiation to the photoconductive drum 23 is made to be proportional to the rotation angle of each reflecting surface of the polygon mirror 50, and that can provide convergence in which a specified relation is given based on the angle at which the polygon mirror 50 is rotated, so that a specified cross-sectional beam diameter is obtained at any position on the photoconductive drum 23 in the longitudinal direction, a dustproof glass 62 that prevents toner, dust, paper powder or the like floating in the image forming part 22 from going around and entering a not-shown housing of the optical beam scanning device 21, and the like. In this embodiment, the imaging lens 61 is formed of a single plastic lens.

Incidentally, the light path of the laser beam L from the semiconductor laser element 41 in the optical beam scanning device 21 to the photoconductive drum 23 is bent in the not-shown housing of the optical beam scanning device 21 by plural not-shown mirrors and the like. Besides, curvatures of the imaging lens 61 in the main scanning direction and the sub-scanning direction, and the light path between the polygon mirror 50 and the photoconductive drum 23 are optimized, so that the imaging lens 61 and at least one of the not-shown mirrors may be integrally formed.

Besides, in the optical beam scanning device shown in FIG. 2 and FIG. 3, when an axis OI along which the main light beam of the incident laser beam directed to each reflecting surface of the polygon mirror 50 and an optical axis OR of the imaging optical system 60 are respectively projected onto the main scanning plane, an angle $\alpha$ formed by both is, for example, 5°. A scanning angle $\beta$ is, for example, 26°. Besides, an angle between the incident laser beam and the optical axis OR of the imaging optical system in a state where the optical beam scanning device is seen from the sub-scanning section is, for example, 2°.

Incidentally, the optical beam scanning device of the embodiment has, an example, a structure of a so-called overillumination (OverIllumination) scanning optical system. Hereinafter, the effectiveness obtained when the structure of the overillumination scanning optical system is adopted in the embodiment will be described in brief. Here, it is assumed that an image surface indicates a transfer member surface, and an imaging surface indicates a surface on which a beam is actually imaged.

In general, an image process speed (paper transport speed), an image resolution, a motor rotation speed, and the number of polygon mirror surfaces have the following relation.

$$P \times R = (25.4 \times Vr \times N)/60 \quad (1)$$

Where
P (mm/s): process speed (paper transport speed)
R (dpi): image resolution (number of dots per inch)
Vr (rpm): polygon motor rotation speed
N: number of polygon mirror surfaces From the equation (1), the print speed and the resolution are proportional to the number of polygon mirror surfaces and the polygon mirror rotation speed. Thus, for realization of high speed and high resolution, it becomes necessary that the number of polygon mirror surfaces is increased or the polygon mirror rotation speed is increased.

However, in a general underillumination scanning optical system, the width of a light flux incident on the polygon mirror in the main scanning direction is smaller than the width of a single reflecting surface of the polygon mirror in the main scanning direction, and the whole incident beam is reflected. The beam diameter on the image surface is proportional to F-number. When the focal distance of an imaging optical system is f, and the main scanning beam diameter on the polygon mirror surface is D, the F-number Fn is expressed by Fn=f/D. Thus, when the beam diameter on the image surface is decreased in order to raise the picture quality, the main scanning beam diameter on the polygon mirror surface must be increased.

Thus, when the number of polygon mirror surfaces is increased in order to realize the high speed and high resolution, it is necessary to enlarge the polygon mirror. When this is rotated at high speed, a load to a motor is large and the motor cost is increased. Besides, the generation of noise, vibration and heat is high, and it becomes necessary to take countermeasures against these. Then, the overillumination type scanning optical system is effective.

In the overillumination type scanning optical system, the width of a beam incident on the polygon mirror in the main scanning direction is larger than the width of a surface of the polygon mirror in the main scanning direction. Thus, since the light flux is reflected by the whole surface of the reflecting surface, even in the case where the number of reflecting surfaces is increased in order to raise the speed and resolution and the beam diameter on the polygon mirror is ensured, the polygon mirror diameter can be made small. Thus, since a load to the polygon motor can be reduced, the cost can be reduced. Besides, since the polygon mirror is small in diameter and the number of surfaces is large, the shape of the polygon mirror approaches a circle, and therefore, the air resistance becomes small, and even if the polygon mirror is rotated at high speed, the generation of noise, vibration and heat can be reduced. Then, since the noise and vibration are reduced, countermeasure parts such as glass become unnecessary or are decreased, and the effect of cost reduction by this is also obtained. Besides, a high duty cycle becomes possible. This overillumination scanning optical system is described in, for example, Laser Scanning Notebook (written by Leo Beiser, SPIE OPTICAL ENGINEERING PRESS).

As stated above, in the optical beam scanning device of the embodiment having the structure of the overillumination scanning optical system, in the direction (main scanning direction) perpendicular to the optical axis direction of the imaging optical system, the width of the light flux incident on the polygon mirror is larger than the width of each of the reflecting surfaces constituting plural reflecting surfaces.

Next, the operation of each structural element of the optical beam scanning device 21 of the embodiment will be described.

In the optical beam scanning device 21 of the embodiment, the divergent laser beam L emitted from the semiconductor laser element 41 is converted by the collimate lens 42 into a converging light beam, a parallel light beam or a divergent light beam in the cross-sectional beam shape.

The laser beam L the cross-sectional shape of which has been shaped into the specified shape passes through the aperture 43 so that the light flux width and light amount are set to be most suitable, and a specified convergence is given by the cylindrical lens 44 only in the sub-scanning direction. By this, the laser beam L has a linear shape extending in the main scanning direction on each reflecting surface of the polygon mirror 50.

The polygon mirror 50 is, for example, a regular dodecahedron, and is formed so that a diameter Dp of its inscribed circle is 25 mm. When the number of reflecting surfaces of the polygon mirror 50 is N, a width Wp of each of the reflecting surfaces (12 surfaces) of the polygon mirror 50 in the main scanning direction can be obtained from $$Wp = \tan(\pi/N) \times Dp \quad (2)$$

In this example, $$Wp = \tan(\pi/12) \times 25 = 6.70 \text{ mm} \quad (3)$$

On the other hand, a beam width DL of the laser beam L irradiated on each reflecting surface of the polygon mirror 50 in the main scanning direction is substantially 32 mm, and as compared with the width Wp=6.70 mm of each reflecting surface of the polygon mirror 50 in the main scanning direction, it is set to be wide. As the beam width becomes wide in the main scanning direction, a fluctuation in light amount between the scanning end and the scanning center on the image surface is decreased.

The laser beam L guided to each of the reflecting surfaces of the polygon mirror 50 and continuously reflected and linearly scanned (deflected) by the rotation of the polygon mirror 50 is given a specified imaging characteristic by the imaging lens 61 of the imaging optical system 60 so that the cross-sectional beam diameter becomes substantially uniform on the photoconductive drum 23 (image surface) at lease in the main scanning direction, and is imaged substantially linearly on the surface of the photoconductive drum 23. Besides, a correction is performed by the imaging lens 61 so that the rotation angle of each reflecting surface of the polygon mirror 50 and the imaging position of the light beam imaged on the photoconductive drum 23, that is, the scanning position have a proportional relation. Accordingly, the speed of the light beam linearly scanned on the photoconductive drum 23 becomes constant in the whole scanning range by the imaging lens 61. Incidentally, the imaging lens 61 is given a curvature (curvature in the sub-scanning direction) capable of correcting also a shift of a scanning position in the sub-scanning direction due to an influence caused from a fact that each reflecting surface of the polygon mirror 50 is unparallel to the sub-scanning direction, that is, a slant occurs in each reflecting surface. Further, the curvature of field in the sub-scanning direction is also corrected. In order to correct these optical characteristics, the curvature in the sub-scanning direction is changed according to the scanning position.

Figure 4:
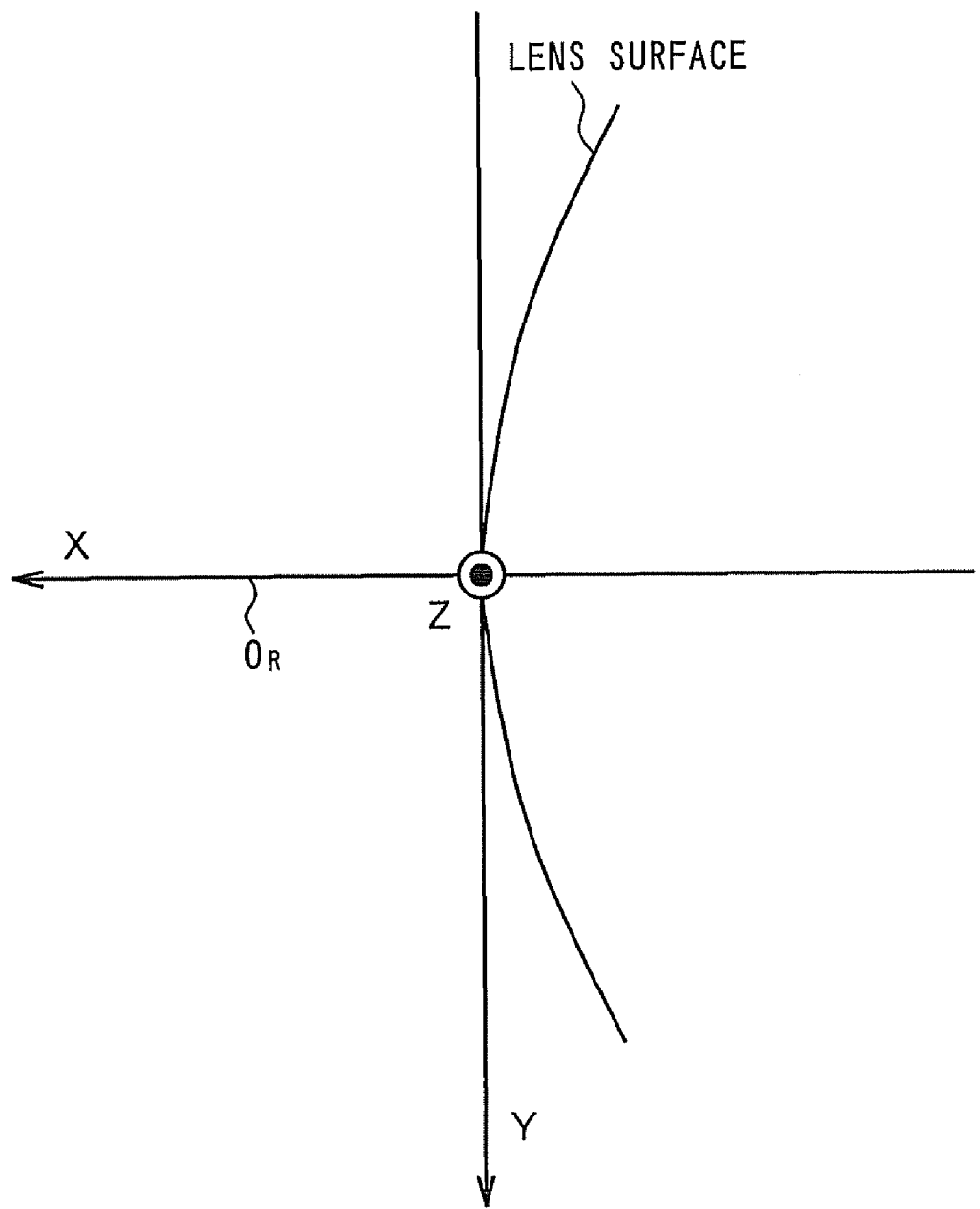
FIG. 4 is a view showing a coordinate system in which a shape of a lens surface is defined.

In the case where the shape of a lens surface is expressed in a coordinate system as shown in FIG. 4, the shape of the lens surface of the imaging lens 61 is defined by, for example, $$X = \frac{CUY*y^2 + CUZ*z^2}{1+\sqrt{1-AY*CUY^2*y^2-AZ*CUZ^2*z^2}} + \sum_{n=0}\sum_{m=0}A_{mn}y^m z^{2n} \quad (4)$$

Incidentally, FIG. 5 shows coordinate data indicating the shape of the lens surface of the imaging lens (fθ lens) 61.

By using the imaging lens 61 as stated above, since the rotation angle θ of each reflecting surface of the polygon mirror 50 is substantially proportional to the position of the laser beam L imaged on the photoconductive drum 23, the position where the laser beam L is imaged on the photoconductive drum 23 can be corrected.

Besides, the imaging lens 61 can correct the position shift in the sub-scanning direction which is caused by the deviation of inclination in the sub-scanning direction among the respective reflecting surfaces of the polygon mirror 50, that is, the fluctuation in the amount of surface slant. In detail, a substantially optically conjugate relation is made to be established between the laser beam incident surface (polygon mirror 50 side) of the imaging lens 61 and the outgoing surface (photoconductive drum 23 side), and accordingly, even in the case where the inclination defined between an arbitrary reflecting surface of the polygon mirror 50 and the rotation axis of the polygon mirror 50 varies (for each reflecting surface), the shift of the scanning position, in the sub-scanning direction, of the laser beam L guided onto the photoconductive drum 23 can be corrected.

Incidentally, since the cross-sectional beam diameter of the laser beam L depends on the wavelength of the light beam L emitted by the semiconductor laser element 41, the wavelength of the laser beam L is 785 nm, and the cross-sectional beam diameter of the laser beam L can be made large, or the cross-sectional beam diameter of the laser beam L can be made further small by making the wavelength 630 nm or shorter.

The return mirror after the deflection is constructed of a plane surface. That is, the surface slant correction is performed by only the fθ lens. The fθ lens surface shape may be, for example, a toric lens which has a rotation symmetric axis with respect to the main scanning axis and in which the curvature in the sub-scanning direction varies according to the scanning position. By doing so, the refractive power in the sub-scanning direction varies according to the scanning position, and a scanning line bending can be corrected. Further, in the case where the curved surface in the sub-scanning direction has the rotation symmetric axis, the degree of freedom of curvature in the sub-scanning direction is extended and the correction can be performed with higher accuracy.

Figure 6:
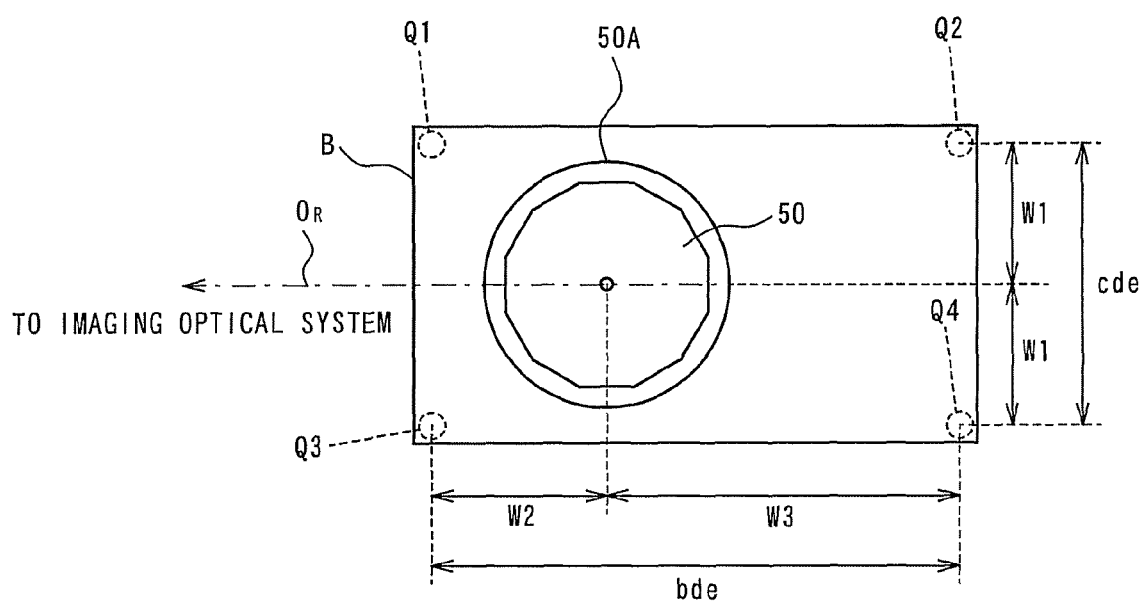
FIG. 6 is a view in which a polygon motor 50A and a polygon mirror 50 mounted on a board B are seen from a rotation axis direction of the polygon mirror.

Next, a structure relating to positioning of the polygon mirror of the optical beam scanning device of the embodiment will be described. FIG. 6 is a view in which the polygon motor 50A and the polygon mirror 50 mounted on a board B are seen from the rotation axis direction of the polygon mirror.

As shown in the figure, the polygon motor 50A that rotatingly drives the polygon mirror 50 in the embodiment is fixed to the board B as a circuit board for drive-controlling the polygon motor. As stated above, the polygon mirror 50 is rotatably supported by the polygon motor 50A and the board B (corresponding to support means and a support part).

Besides, the board B comes in contact with positioning parts (positioning means) made of plural contact parts Q1 to Q4 at specified positions, so that the positioning is performed. These plural contact parts Q1 to Q4 are provided in, for example, the housing of the optical beam scanning device 21, the casing of the digital copying apparatus 1, or the like.

Specifically, the plural contact parts Q1 to Q4 come in contact with the board B at the side where the polygon motor 50A is not mounted, and are arranged so that the shortest distance between the contact positions of the plural contact parts in the optical axis OR direction of the imaging optical system 60 is longer than the shortest distance between the contact positions of the plural contact parts in the direction (main scanning direction) perpendicular to the optical axis OR direction (cde<bde). As stated above, since the interval between the contact positions in the optical axis OR direction is made wider than the interval of the contact positions in the main scanning direction, with respect to a positioning error of the polygon mirror resulting from a shape error of the board or the like, at least a deflection error around an axis parallel to the main scanning direction can be suppressed to be smaller than a deflection error around an axis parallel to the optical axis direction. Incidentally, in the structure in which the imaging lens is constructed of a single lens as in this embodiment, since the imaging optical system approaches the polygon mirror side, the degree of influence of the inclination of the polygon mirror becomes large, and accordingly, it is particularly effective to position the polygon mirror by the foregoing structure. Incidentally, in this embodiment, a relation that the shortest distance between the rotation axis of the polygon mirror 50 and the contact positions to the plural contact parts is longer than the shortest distance between the rotation axis of the polygon mirror 50 and the contact positions to the plural contact parts in the direction perpendicular to the optical axis OR direction (W1<W2, W1<W3) is also established.

Besides, in the overillumination scanning optical system, since the number of the reflecting surfaces of the polygon mirror becomes large, the scanning angle becomes narrow, and a light path length after deflection becomes long in order to produce a desired scanning width on the image surface. Thus, since the degree of influence of the inclination of the polygon mirror becomes large, it is particularly effective to perform positioning of the polygon mirror by the foregoing structure.

Incidentally, in this embodiment, the structure is such that the size of the board B in the optical axis OR direction of the imaging optical system 60 is larger than the size in the direction perpendicular to the optical axis OR direction. Since the board B is made to have the shape as stated above, when the plural contact parts Q1 to Q4 are brought into contact with the vicinities of the edges of the board B, the foregoing positional relation of the plural contact parts Q1 to Q4 can be easily realized. Besides, the board B does not protrude from the contact position of the contact part where positioning is performed, and a waste of space does not occur.

Besides, the board B in this embodiment has the structure that in the optical axis OR direction of the imaging optical system, its part on the side closer to the imaging optical system than the rotation axis of the polygon mirror 50 is shorter than that on the side not closer to the imaging optical system than the rotation axis (W2<W3) (see FIG. 6). In general, in the optical axis OR direction, there often occurs a case where various optical systems and support members to support these optical systems are arranged at a position closer to the imaging optical system than the polygon mirror 50. Thus, when the board B is made to have the shape long on the side not closer to the imaging optical system to the utmost, the length of the board B in the optical axis OR direction is ensured, and the interference of the optical system with respect to the board B between the polygon mirror 50 and the imaging optical system can be avoided. Besides, the board shape is made such that while the interference with another optical part is avoided, the space in the apparatus is effectively used, so that an area in which an electric part can be mounted can be ensured. Here, it is desirable that the size of the board B in the optical axis OR direction is made as large as possible within a range in which an arrangement space in the apparatus allows.

Figure 7:
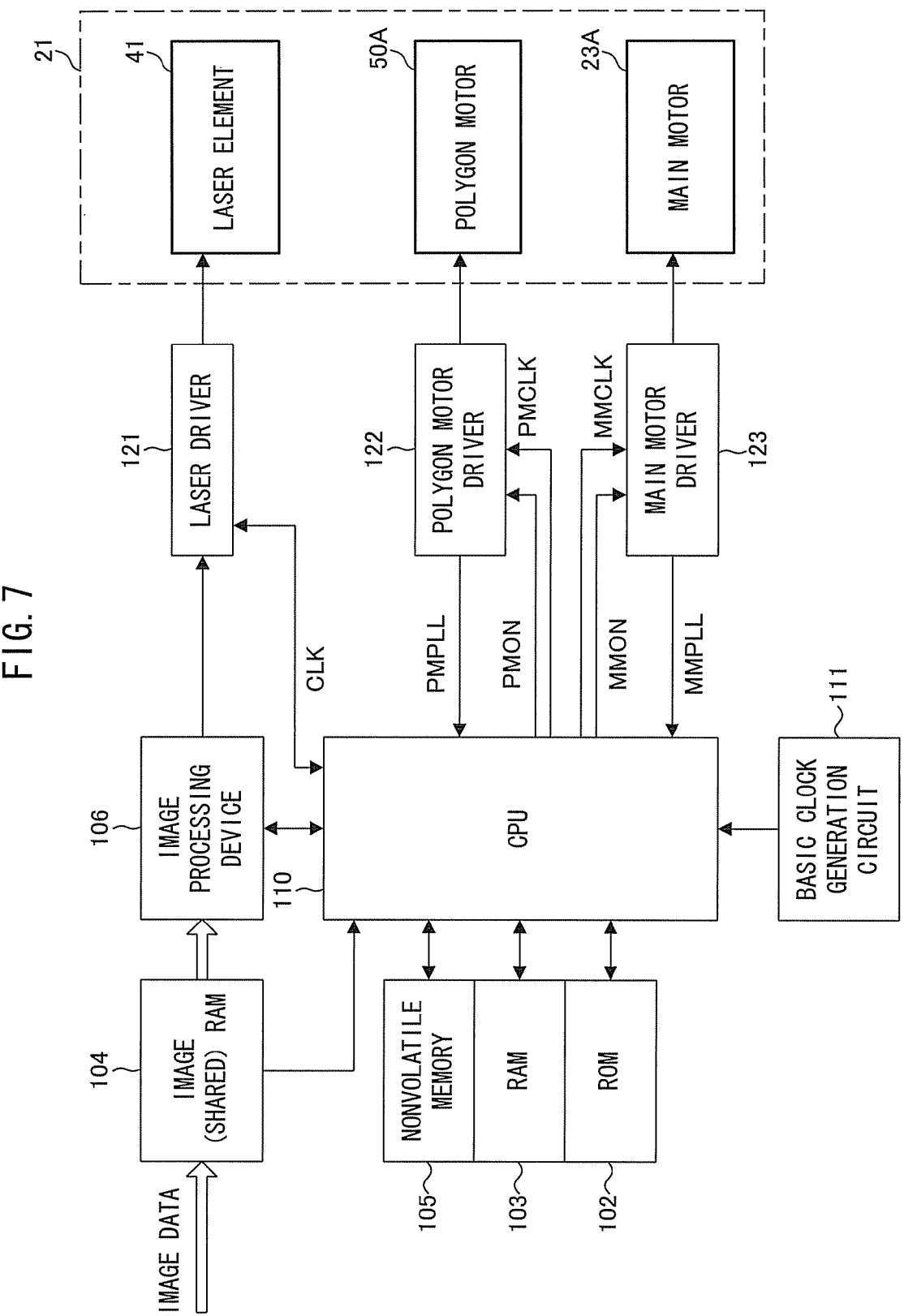
FIG. 7 is a schematic block diagram showing an example of a drive circuit of a digital copying apparatus including the optical beam scanning device having the structure as stated above.

FIG. 7 is a schematic block diagram showing an example of a drive circuit of the digital copying apparatus including the optical beam scanning device having the structure as described above.

A CPU 101 as a main control device is connected with a ROM (Read Only Memory) 102 in which a specified operation rule and initial data are stored, a RAM 103 to temporarily store inputted control data, a shared (image) RAM 104 which holds image data from the CCD sensor 14 or image data supplied from an external device and outputs the image data to an image processing circuit described below, an NVM (nonvolatile memory) 105 which holds, even when power application to the copying apparatus 1 is stopped, data stored up to that time by a battery backup, an image processing device 106 which applies a specified image processing to the image data stored in the image RAM 104 and outputs it to a laser driver described below, and the like.

The CPU 101 is also connected with a laser driver 121 to cause the semiconductor laser element 41 of the optical beam scanning device 21 to emit light, a polygon motor driver 122 which drives the polygon motor 50A to rotate the polygon mirror 50, a main motor driver 123 which drives a main motor 23A to drive the photoconductive drum 23 and a transport mechanism of an accompanying sheet (member to be transferred), and the like.

Figure 8:
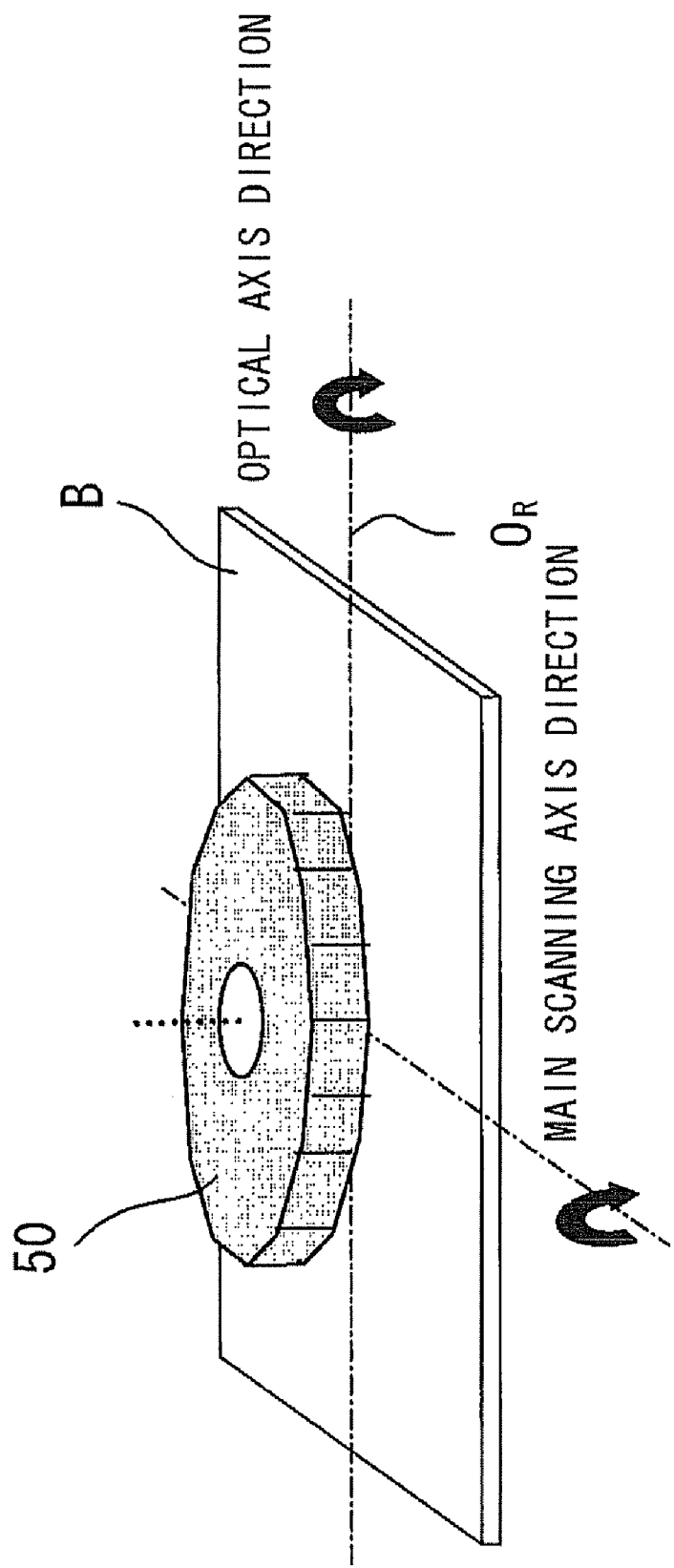
FIG. 8 is a view for explaining a positioning error of the polygon mirror 50.
Figure 9:
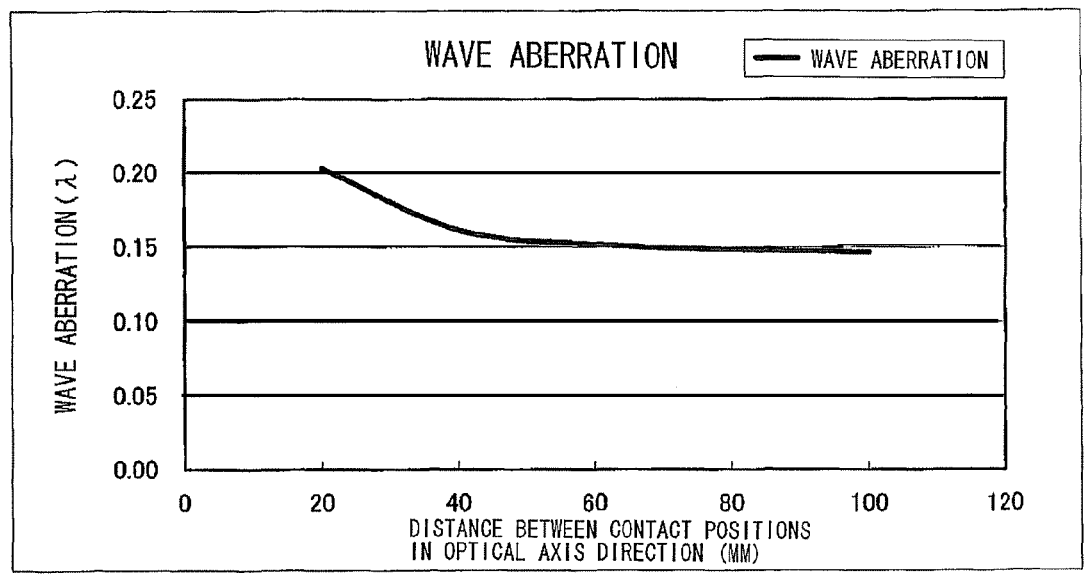
FIG. 9 is a graph showing a relation between an interval (distance between contact positions) of contact parts Q1 to Q4 and a simulation result of a wave aberration generated according to a change of the distance between the contact positions.
Figure 10:
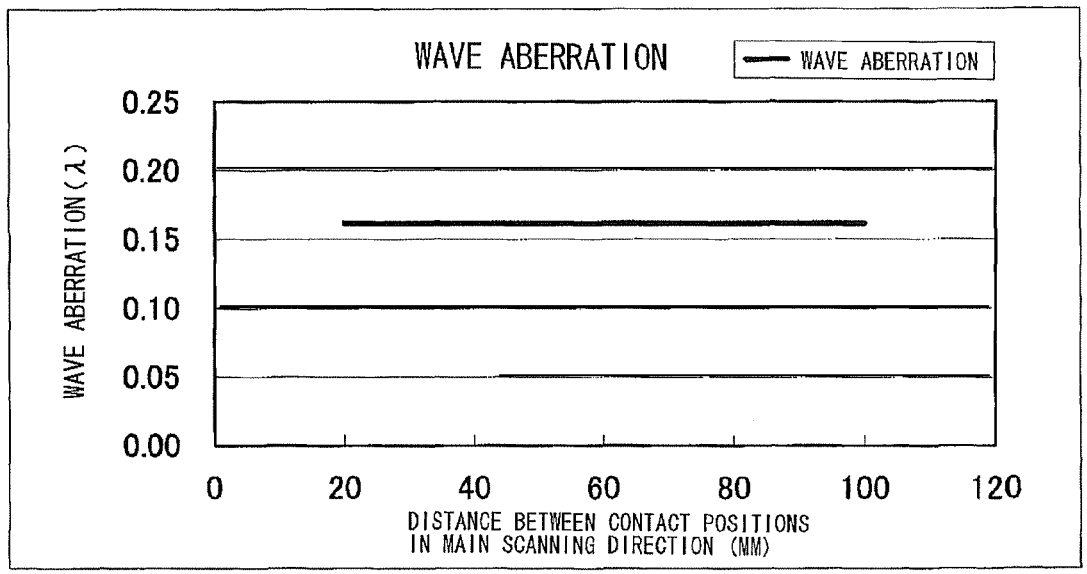
FIG. 10 is a graph showing a relation between an interval (distance between contact positions) of contact parts Q1 to Q4 and a simulation result of a wave aberration generated according to a change of the distance between the contact positions.
Figure 13:
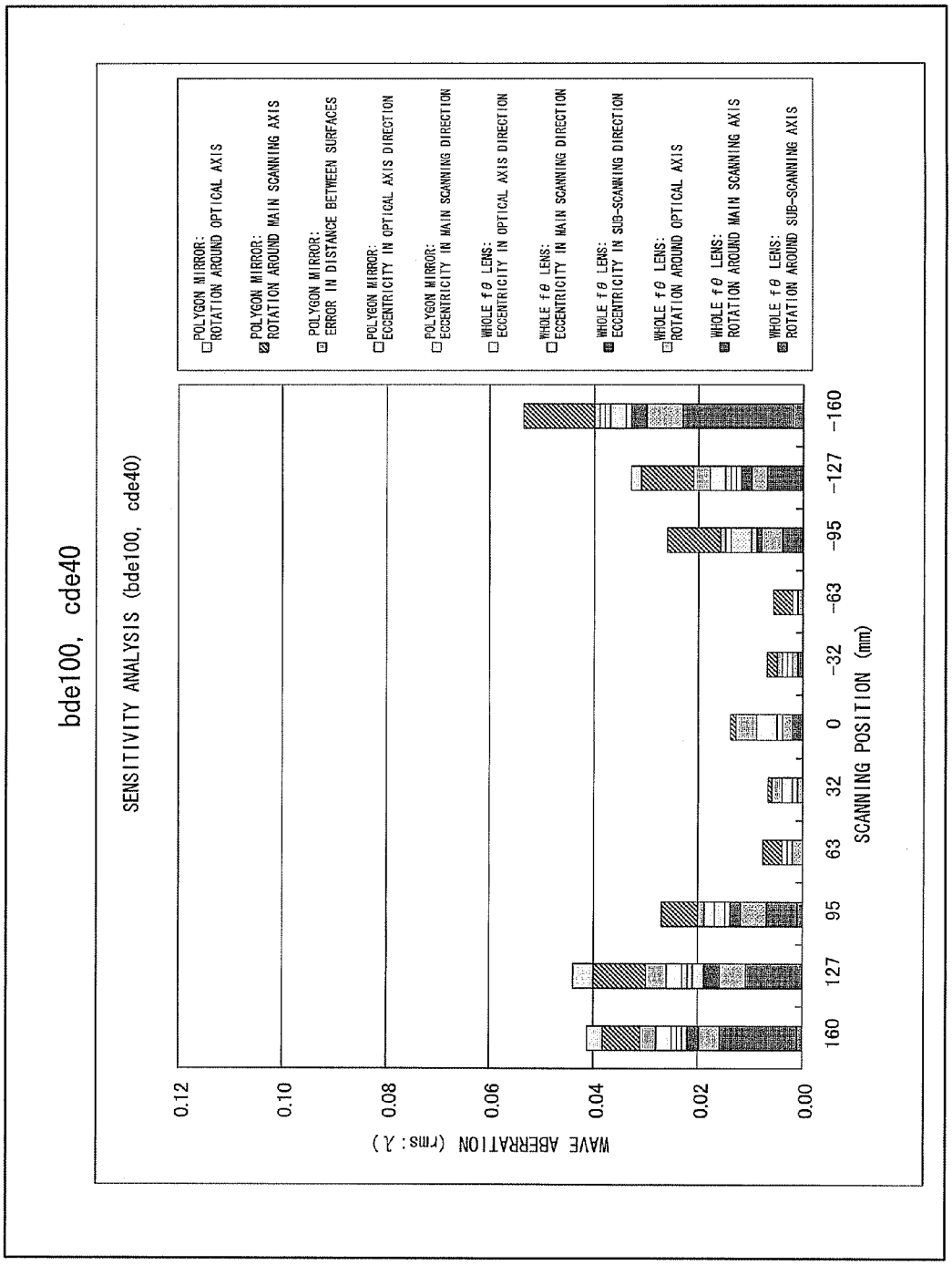
FIG. 13 shows a simulation result in which calculation is performed on the degree of influence (sensitivity) on a wave aberration in a case where a distance between contact positions of a contact part in an optical axis direction is changed.
Figure 14:
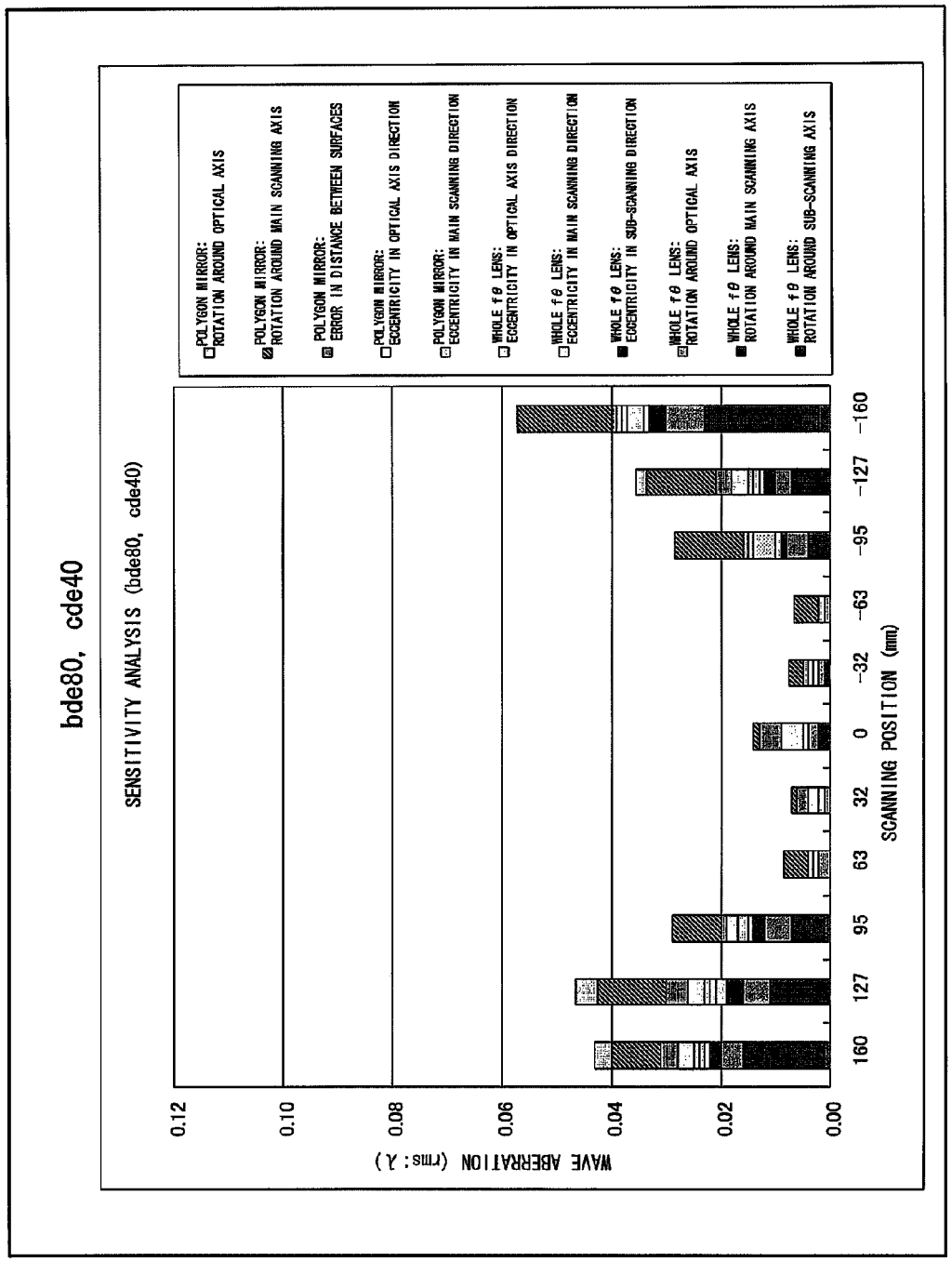
FIG. 14 shows a simulation result in which calculation is performed on the degree of influence (sensitivity) on a wave aberration in a case where a distance between contact positions of a contact part in an optical axis direction is changed.
Figure 15:
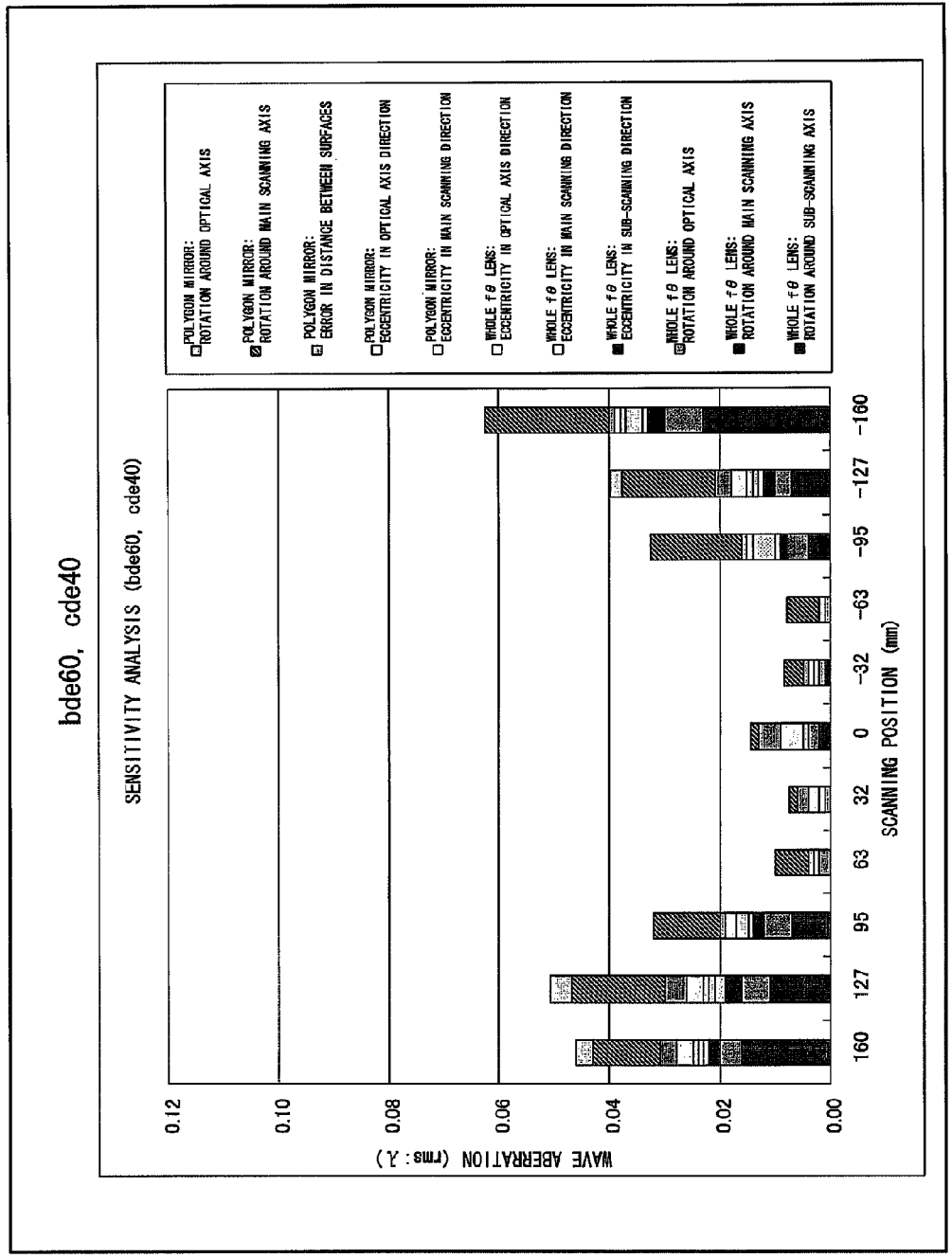
FIG. 15 shows a simulation result in which calculation is performed on the degree of influence (sensitivity) on a wave aberration in a case where a distance between contact positions of a contact part in an optical axis direction is changed.
Figure 16:
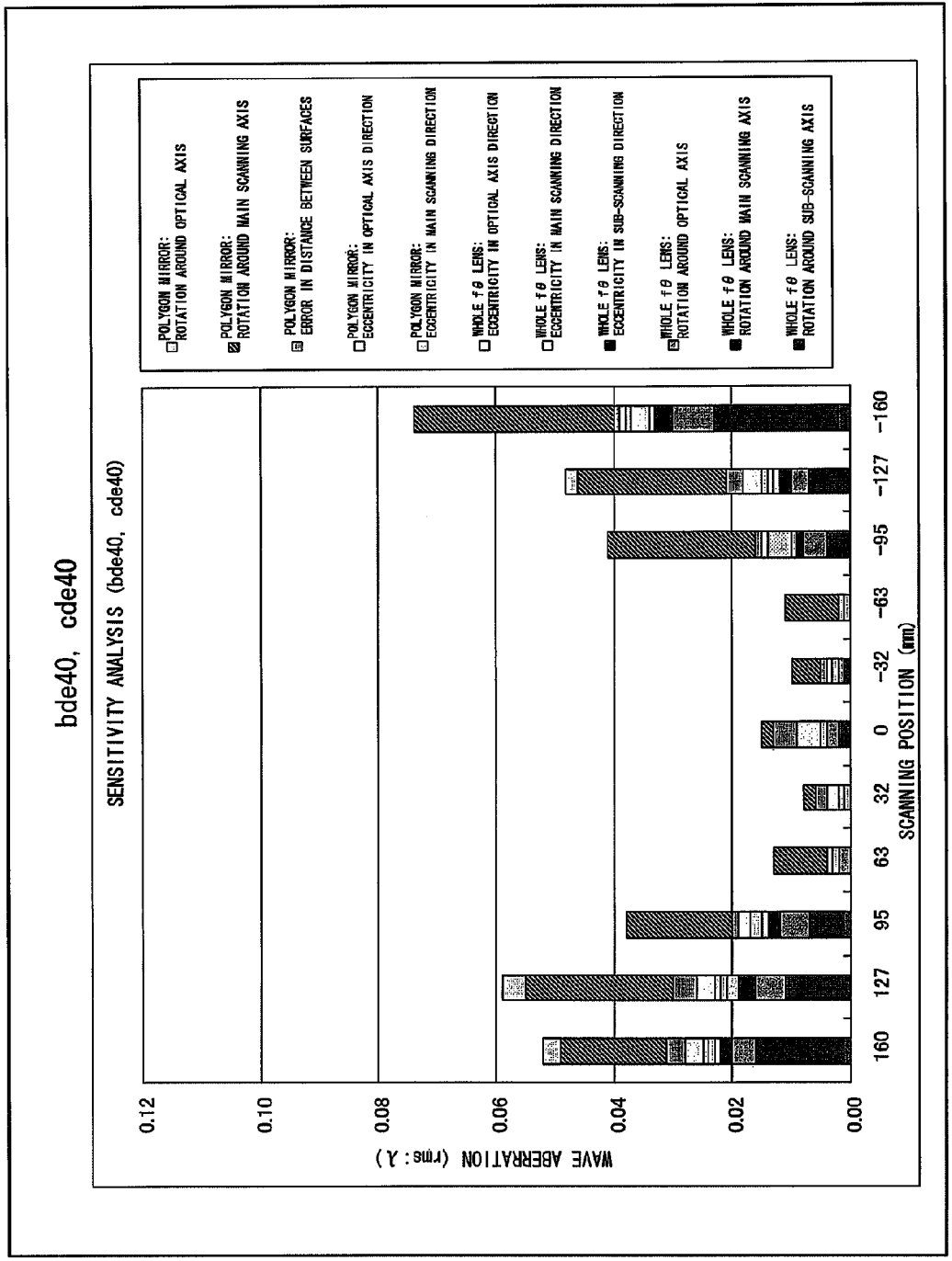
FIG. 16 shows a simulation result in which calculation is performed on the degree of influence (sensitivity) on a wave aberration in a case where a distance between contact positions of a contact part in an optical axis direction is changed.
Figure 17:
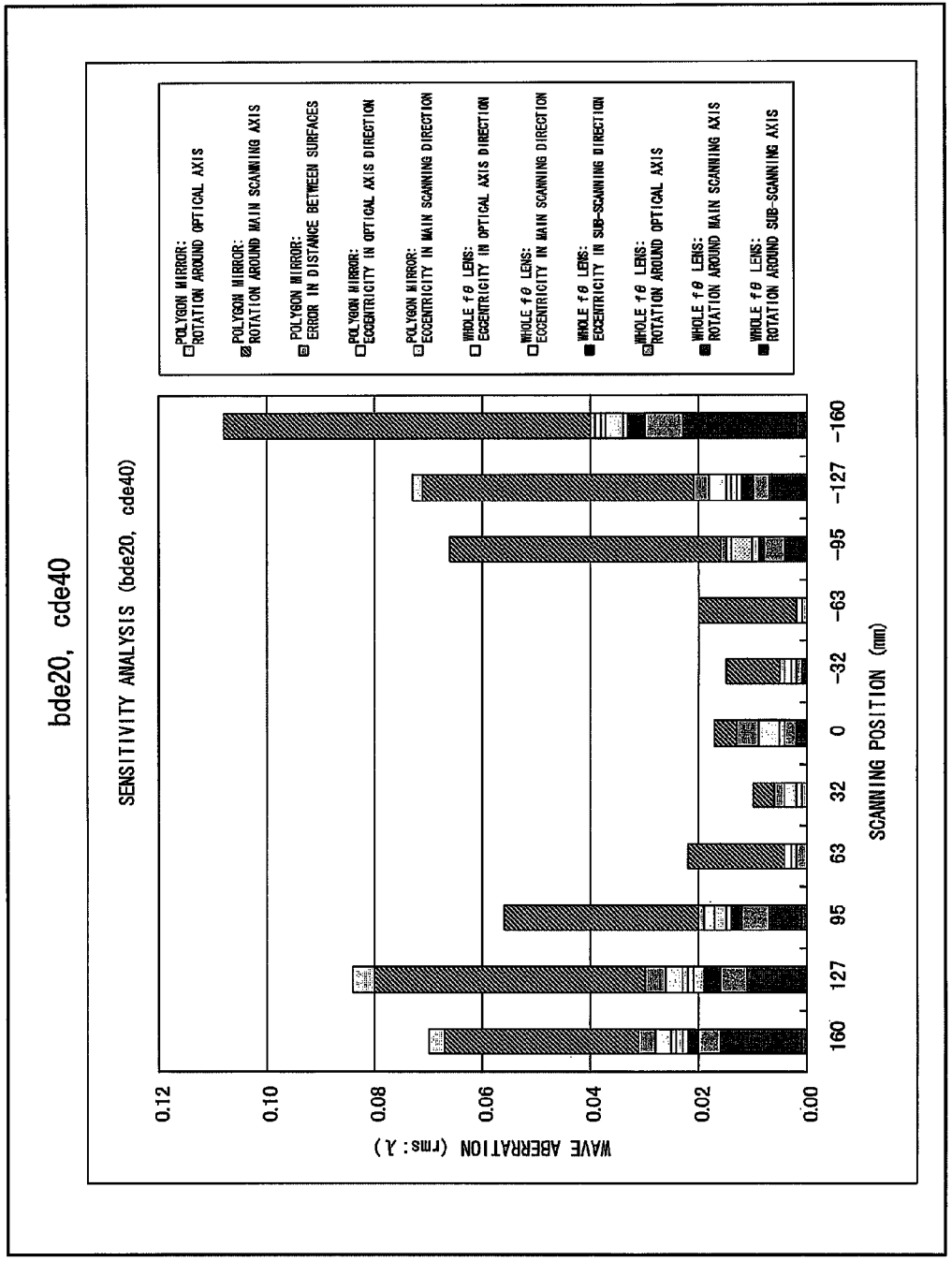
FIG. 17 shows a simulation result in which calculation is performed on the degree of influence (sensitivity) on a wave aberration in a case where a distance between contact positions of a contact part in an optical axis direction is changed.
Figure 18:
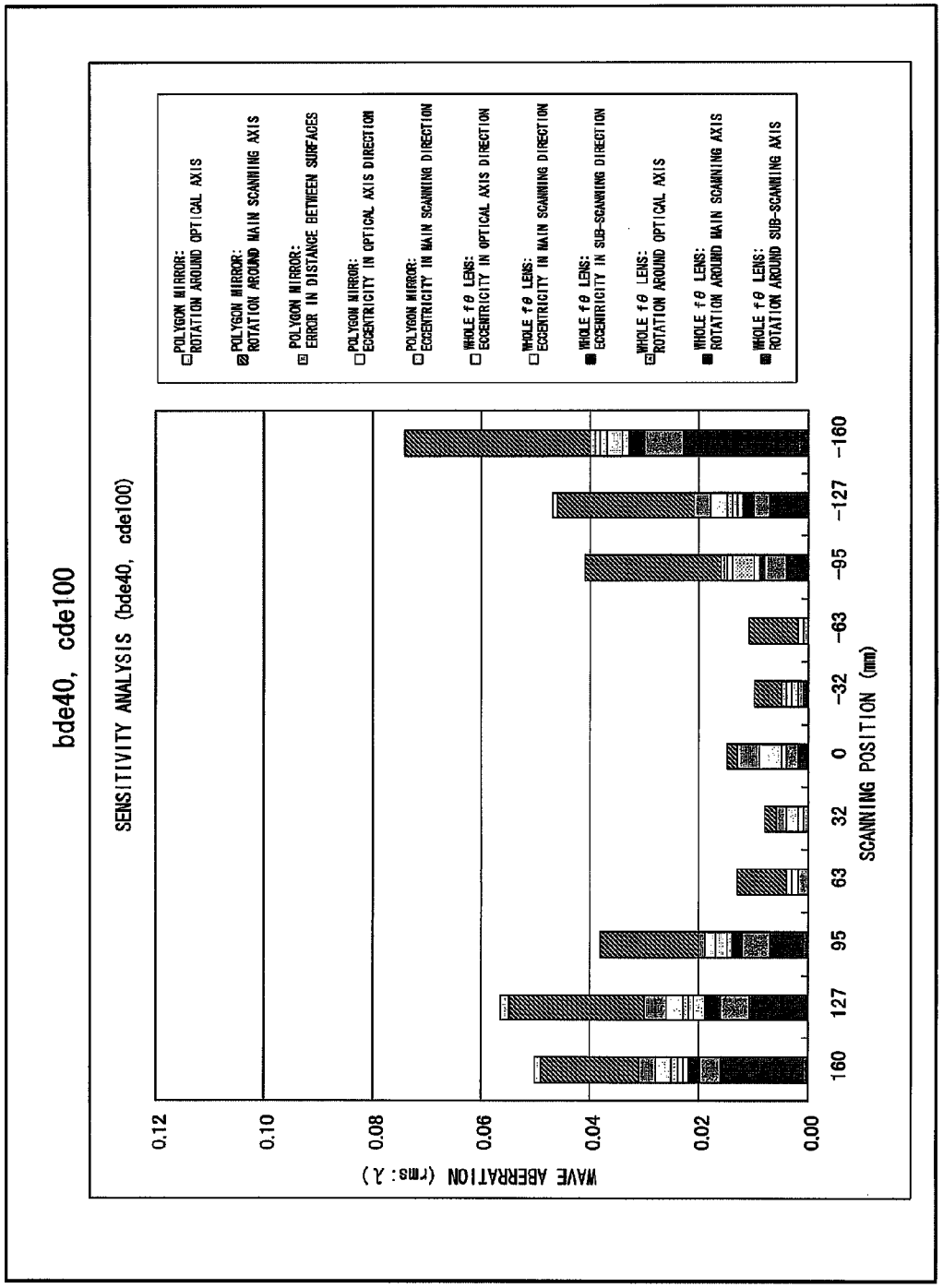
FIG. 18 shows a simulation result in which calculation is performed on the degree of influence (sensitivity) on a wave aberration in a case where a distance between contact positions of a contact part in an optical axis direction is changed.
Figure 19:
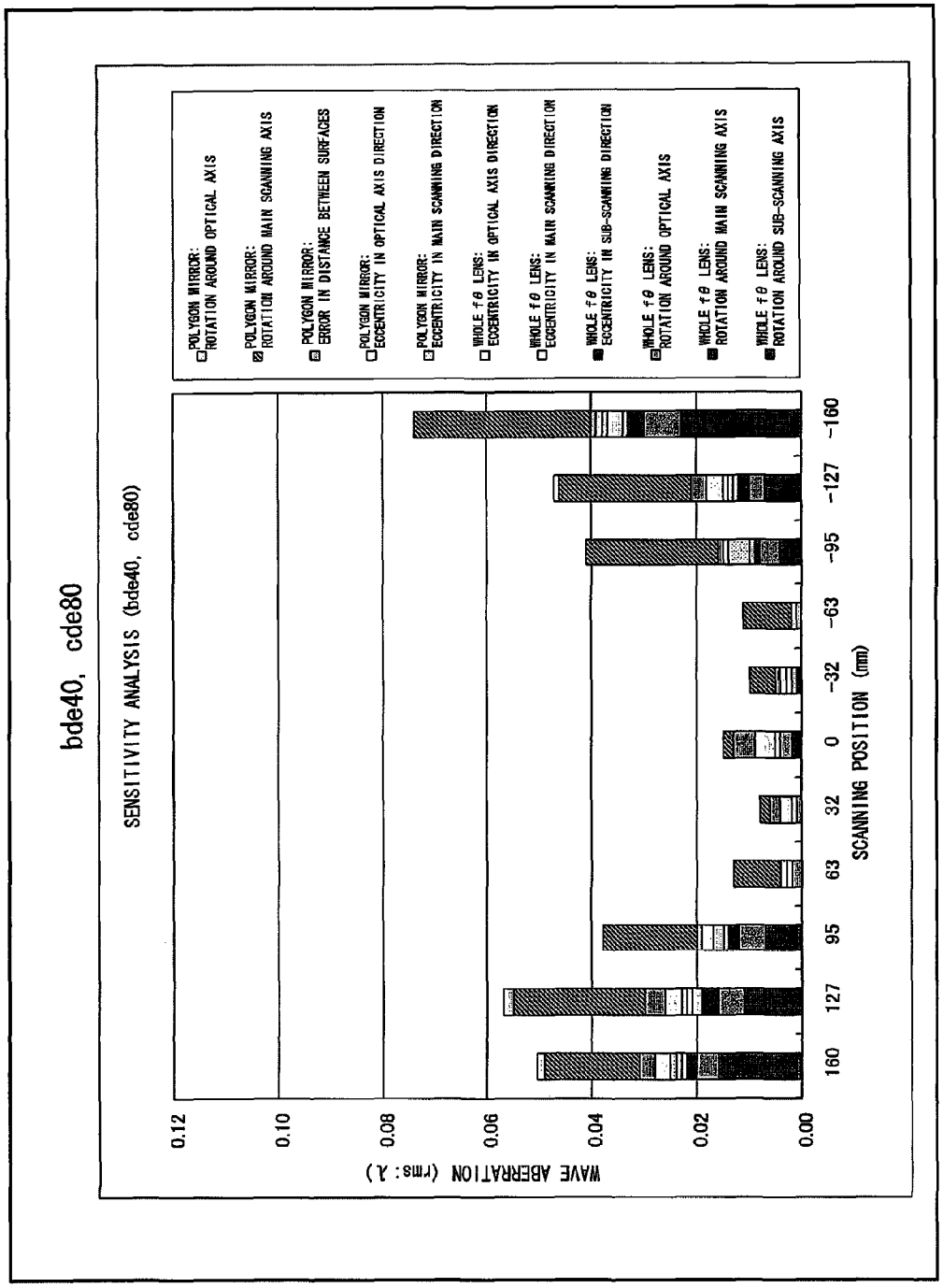
FIG. 19 shows a simulation result in which calculation is performed on the degree of influence (sensitivity) on a wave aberration in a case where a distance between contact positions of a contact part in an optical axis direction is changed.
Figure 20:
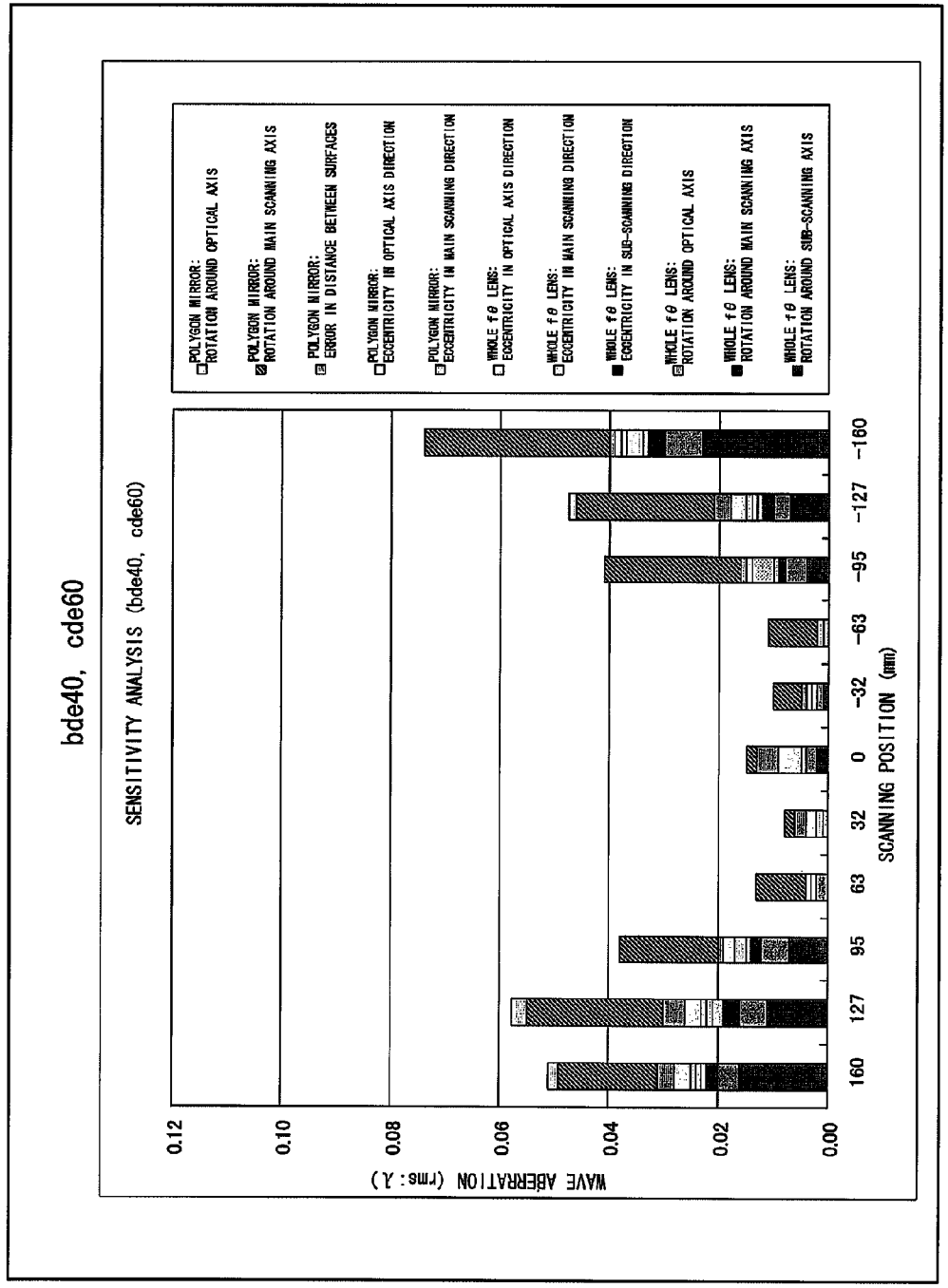
FIG. 20 shows a simulation result in which calculation is performed on the degree of influence (sensitivity) on a wave aberration in a case where a distance between contact positions of a contact part in an optical axis direction is changed.
Figure 21:
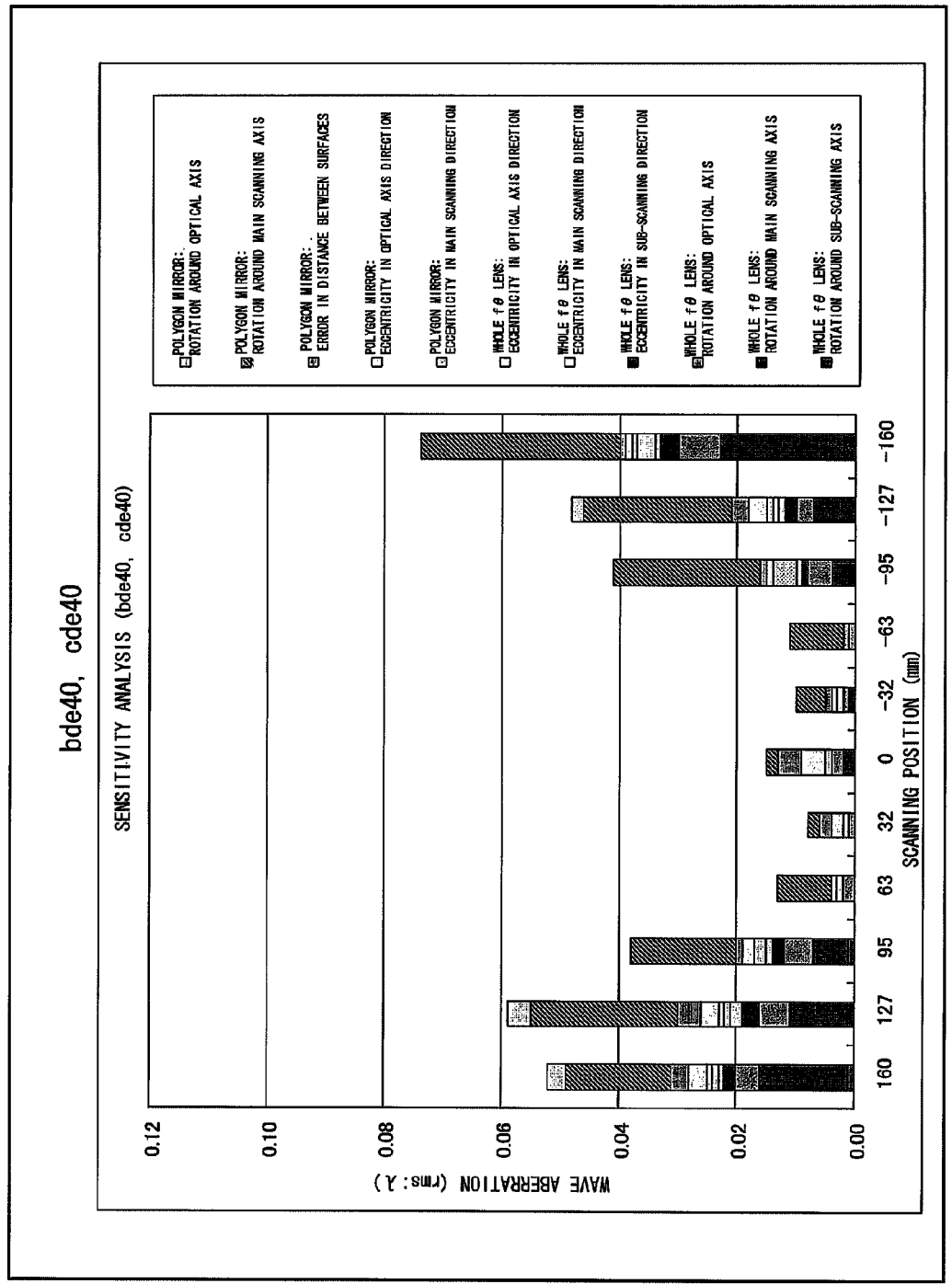
FIG. 21 shows a simulation result in which calculation is performed on the degree of influence (sensitivity) on a wave aberration in a case where a distance between contact positions of a contact part in an optical axis direction is changed.
Figure 22:
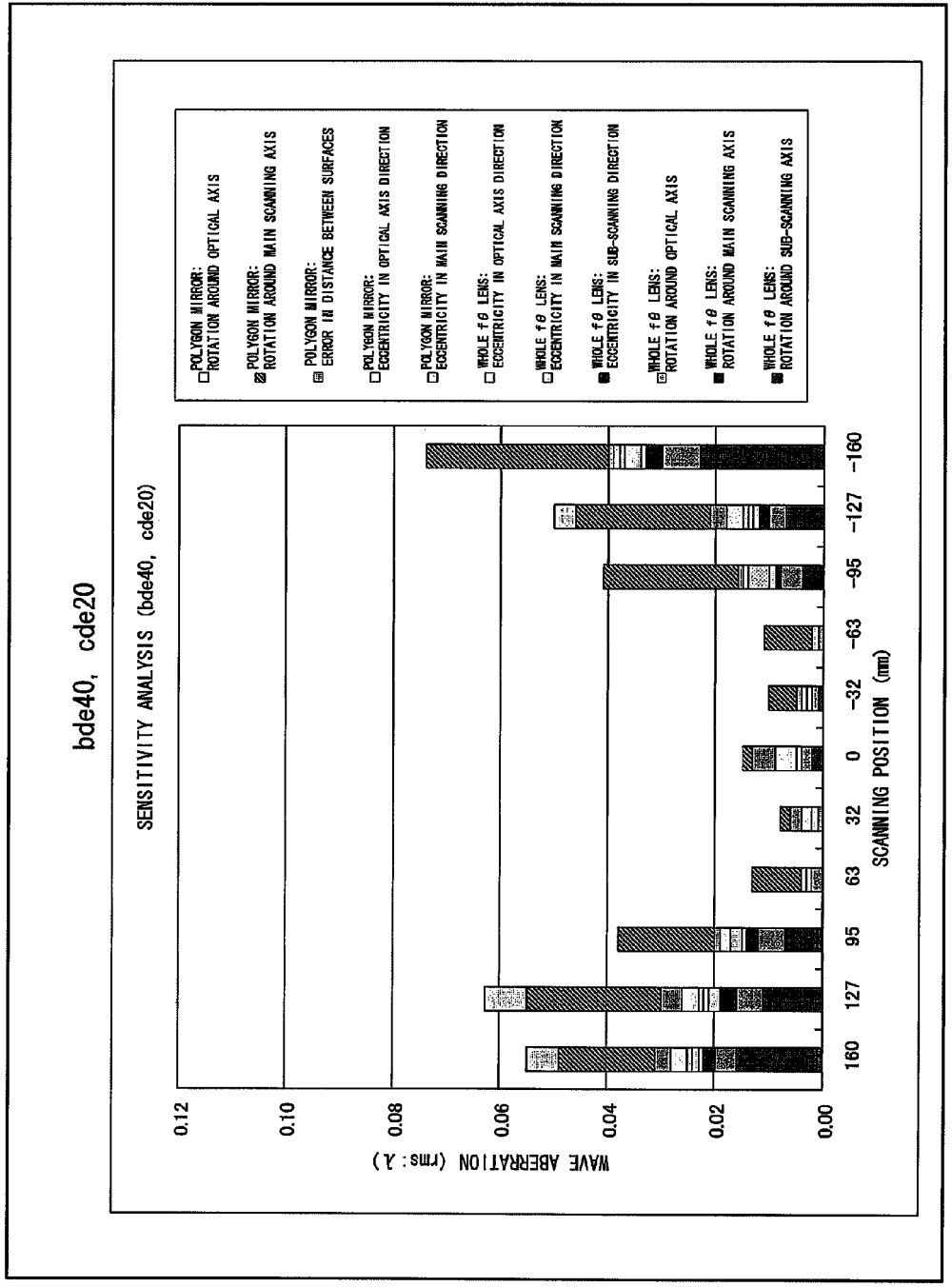
FIG. 22 shows a simulation result in which calculation is performed on the degree of influence (sensitivity) on a wave aberration in a case where a distance between contact positions of a contact part in an optical axis direction is changed.

Next, the effect of the positioning structure of the polygon mirror of the embodiment will be described. FIG. 8 is a view for explaining the positioning error of the polygon mirror 50, FIG. 9 and FIG. 10 are graphs each showing a relation between the interval (distance between contact positions) of the contact parts Q1 to Q4 and the simulation result of a wave aberration generated according to a change of the distance between the contact positions, and FIG. 11 and FIG. 12 are tables each showing a simulation result concerning a relation among the distance between the contact positions, the inclination angle of the polygon mirror, and the beam diameter of the scanning light beam.

As shown in FIG. 9 to FIG. 12, it is understood that the influence of an error of attachment of the polygon mirror 50A to the optical housing is large when a rotation around the main scanning axis occurs. Thus, as in the embodiment, in order that the angle of an inclination error of the polygon mirror around the main scanning axis becomes smaller than the rotation around the optical axis OR direction, the distance of the plural contacts for positioning the polygon mirror in the optical axis direction is made longer than that in the main scanning axis direction. In general, since the shape error of the contact part of the housing of the optical beam scanning device is about 0.05 mm, as the distance between the contact parts becomes long, the inclination angle of the polygon mirror becomes small, and a bad influence on the optical characteristics can be reduced. Besides, by making the length in the main scanning axis direction short and by making the length in the optical axis direction long, it becomes possible to ensure an area in which an optical part is mounted, and the optical beam scanning device can be miniaturized. From the foregoing simulation result, it is understood that when the interval, in the optical axis direction, of the contact positions where contact is made with the board B is 40 mm or more, or the inclination angle of the polygon mirror is 0.00716° or less, the fluctuation of the beam diameter of the scanning light beam hardly occurs, and an image is not degraded.

FIG. 13 to FIG. 17 show simulation results obtained by calculating the degree of influence (sensitivity) on the wave aberration in the case where the distance between the contact positions of the contact parts Q1 to Q4 in the optical axis OR direction (see bde in FIG. 6 (unit of numeral is mm)) is changed, and FIGS. 18 to 22 show simulation results obtained by calculating the degree of influence (sensitivity) on the wave aberration corresponding to the scanning position of the photoconductive drum in the case where the distance (see cde in FIG. 6) between the contact positions of the contact parts Q1 to Q4 in the main scanning direction is changed. Incidentally, the "scanning position" here means the position on the photosensitive surface of the photoconductive drum 23 in the main scanning direction, and is in the range of −160 mm to 160 mm while the center position is zero. Also from the results shown in FIG. 13 to FIG. 22, it is understood that the influence given to the wave aberration by the distance (bde) between the contact positions of the contact parts Q1 to Q4 in the optical axis OR direction is larger than the influence given to the wave aberration by the distance (cde) between the contact positions of the contact parts Q1 to Q4 in the main scanning direction.

Figure 23:
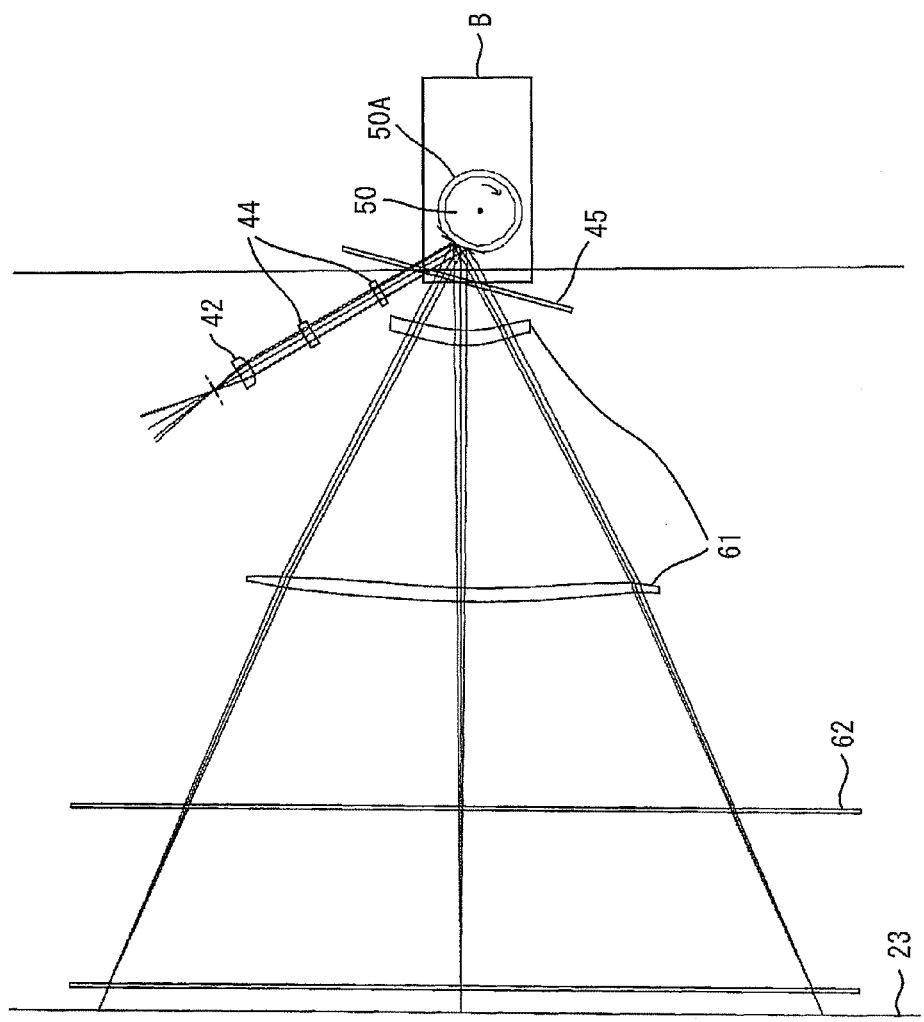
FIG. 23 is a view for explaining a positioning structure of a polygon mirror in a structure of an oblique incident system.

Incidentally, in the embodiment, although the structure is such that the light flux shaped by the pre-deflection optical system is reflected by the mirror 45 positioned within the scanning range of the scanning light beam of the polygon mirror 50 and the reflected light beam is made incident on the polygon mirror 50, no limitation is made to this, and for example, as shown in FIG. 23, it is needless to say that the positioning structure of the polygon mirror of the embodiment is effective also in an optical beam scanning device having a structure of a so-called "oblique incident system" in which a light flux incident on the polygon mirror 50 is incident from an optical system positioned outside the scanning range of the light flux scanned by the polygon mirror 50. Besides, especially in the oblique incident system, since optical parts constituting the pre-deflection optical system are often close to the polygon mirror 50 in the main scanning direction, when the polygon mirror is supported by the support part with a small size in the main scanning direction and positioning is performed as in the embodiment, it contributes to a reduction in space and is effective.

Besides, in the foregoing embodiment, although the arrangement of the contact positions to the board B has been described as means for performing positioning to the imaging optical system of the polygon mirror, no limitation is made to this, and for example, a flange part (corresponding to a casing of a motor) extending to the outside in the rotation radius direction of the polygon mirror 50 is provided on the outer peripheral surface of the polygon motor 50A, and the contact parts Q1 to Q4 may be brought into contact with the flange part. As stated above, it is sufficient if an object with which the contact parts Q1 to Q4 comes in contact is a portion (portion which can be made a positioning object) which determines the positional relation and the posture of the polygon mirror 50 with respect to the imaging optical system.

In addition, in the foregoing embodiment, although the example has been described in which the number of the contact parts coming in contact with the support part is four, no limitation is made to this, and for example, the number may be three. Also in this case, when the foregoing relation of the contact positions (see FIG. 6) is established, the same effect as that of this embodiment can be obtained.

Besides, in the foregoing embodiment, although the example has been described in which the position of the rotation axis of the polygon mirror is arranged to be close to the imaging optical system on the board B, for example, a structure may be made such that the rotation axis of the polygon mirror is arranged at the center position of the board B in the optical axis direction.

Besides, as described above, in the case of the structure in which the flange part or the like is provided to the polygon mirror 50 and positioning is performed by bringing the contact parts Q1 to Q4 into contact with the flange part, it is desirable that the flange part or the casing of the polygon motor 50A including the flange part is formed of a material having high heat radiation performance, such as aluminum. By this, the occurrence of the shape error due to heat expansion can be suppressed.

As stated above, according to the embodiment, the influence given to the optical characteristics by the error in attachment of the polygon mirror to the housing is reduced, and miniaturization in the whole apparatus can be realized.

Although the invention has been described in detail by the specific mode, it would be obvious for one skilled in the art that various modifications and improvements can be made without departing from the sprit and scope of the invention.

As described above in detail, according to the invention, it is possible to provide the technique which can improve the optical characteristics by suppressing the occurrence of error in attachment of the rotary deflector that deflects the light flux from the light source and scans it in the main scanning direction.

What is claimed is:

1. An optical beam scanning device comprising:
 a rotary deflector that deflects a light flux from a light source and scans it in a main scanning direction;
 an imaging lens that images the light flux scanned by the rotary deflector onto a scanning object; and
 a board having a support part that supports the rotary deflector rotatably, and a positioning part that comes in contact with the support part at plural contact positions, in which a distance between contact positions in an optical axis direction of the imaging lens is longer than a distance between contact positions in the main scanning direction.

2. The optical beam scanning device according to claim 1, wherein the distance between the contact positions in the optical axis direction is longer than a shortest distance between the plural contact positions in the main scanning direction.

3. The optical beam scanning device according to claim 2, wherein the distance between the contact positions in the optical axis direction is a shortest distance among distances between the plural contact positions in the optical axis direction.

4. The optical beam scanning device according to claim 3, wherein the imaging lens is a single lens.

5. The optical beam scanning device according to claim 3, wherein the plural contact positions are positioned at a corner of the board.

6. The optical beam scanning device according to claim 3, wherein a width of the light flux incident on the rotary deflector is larger than a width of each of reflecting surfaces of the rotary deflector in the main scanning direction.

7. The optical beam scanning device according to claim 1, wherein the imaging lens is a single lens.

8. The optical beam scanning device according to claim 1, wherein
 the board is rectangular having a longer side in the optical axis direction than a side in the main scanning direction, and
 the plural contact positions are positioned at a corner of the board.

9. The optical beam scanning device according to claim 8, wherein the rotary deflector is a polygon mirror supported by a rotation axis.

10. The optical beam scanning device according to claim 9, wherein
 a distance from the rotation axis to one end of the board in the main axis direction is the same as a distance from the rotation axis to the other end of the board in the main scanning direction.

11. The optical beam scanning device according to claim 10, wherein
 a distance from the rotation axis to one end or the other end of the board in the optical axis direction is longer than the distance from the rotation axis to the one end of the board in the main scanning direction.

12. The optical beam scanning device according to claim 11, wherein the one end of the board in the optical axis direction is located in a direction of the imaging lens, and the distance from the rotation axis to the one end of the board in the optical axis direction is shorter than the distance from the rotation axis to the other end of the board in the optical axis direction.

13. The optical beam scanning device according to claim 1, wherein a width of the light flux incident on the rotary deflector is larger than a width of each of reflecting surfaces of the rotary deflector in the main scanning direction.

14. A digital copying machine, comprising:

a rotary deflector that deflects a light flux from a light source and scans the light flux in a main scanning direction;

an imaging lens that images the light flux scanned by the rotary deflector onto a specified scanning object;

a board having a support part that supports the rotary deflector rotatably, and a positioning part that comes in contact with the support part at plural contact positions, in which a distance between contact positions in an optical axis direction of the imaging lens is longer than a distance between contact positions in the main scanning direction; and a developing device containing a toner for developing a latent image formed by a light flux imaged on the scanning object.

15. The digital copying machine according to claim 14, wherein the distance between the contact positions in the optical axis direction is longer than a shortest distance between the plural contact positions in the main scanning direction.

16. The digital copying machine according to claim 15, wherein the distance between the contact positions in the optical axis direction is a shortest distance among distances between the plural contact positions in the optical axis direction.

17. The digital copying machine according to claim 16, wherein the imaging lens is a single lens.

18. The digital copying machine according to claim 16, wherein the plural contact positions are positioned at a corner of the board.

19. The digital copying machine according to claim 16, wherein a width of the light flux incident on the rotary deflector is larger than a width of each of reflecting surfaces of the rotary deflector in the main scanning direction.

* * * * *